(12) United States Patent
Tamada et al.

(10) Patent No.: US 10,782,452 B2
(45) Date of Patent: Sep. 22, 2020

(54) ANTI-REFLECTION COATING AND OPTICAL MEMBER COMPRISING SAME

(71) Applicant: RICOH IMAGING COMPANY, LTD., Tokyo (JP)

(72) Inventors: Takaaki Tamada, Tokyo (JP); Naohito Sasaki, Tokyo (JP); Hiroyuki Nakayama, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/413,565

(22) Filed: Jan. 24, 2017

(65) Prior Publication Data

US 2017/0131436 A1  May 11, 2017

Related U.S. Application Data

(62) Division of application No. 14/453,193, filed on Aug. 6, 2014, now Pat. No. 9,581,733.

(30) Foreign Application Priority Data

Aug. 23, 2013 (JP) ................. 2013-173437
Nov. 22, 2013 (JP) ................. 2013-241422

(51) Int. Cl.
  *G02B 1/11*   (2015.01)
  *G02B 1/115*  (2015.01)
  *G02B 5/28*   (2006.01)

(52) U.S. Cl.
  CPC ............... *G02B 1/115* (2013.01); *G02B 1/11* (2013.01); *G02B 5/286* (2013.01)

(58) Field of Classification Search
  CPC .............. G02B 1/111; G02B 1/11; G02B 5/28
  USPC ............... 359/584, 586, 587, 580, 589, 581; 428/331
  See application file for complete search history.

(56) References Cited

U.S. PATENT DOCUMENTS

5,532,871 A   7/1996  Hashimoto et al.
5,948,482 A   9/1999  Brinker et al.
5,993,898 A   11/1999 Nagatsuka
(Continued)

FOREIGN PATENT DOCUMENTS

JP   10-227902    8/1998
JP   10-319209    12/1998
(Continued)

OTHER PUBLICATIONS

Jue Wang et al., "Scratch-Resistant Improvement of Sol-Gel Derived Nano-Porus Silica Films", Journal of Sol-Gel Science and Technology 18, 219-224, 2000.
(Continued)

*Primary Examiner* — Audrey Y Chang
(74) *Attorney, Agent, or Firm* — Haug Partners LLP

(57) ABSTRACT

An anti-reflection coating having an three-layer structure comprising first to third layers formed in this order on a substrate, the substrate having a refractive index of 1.6-1.9, the first layer having a refractive index of 1.37-1.57, the second layer having a refractive index of 1.75-2.5, and the third layer having a refractive index of 1.18-1.32, to light in a wavelength range of 550 nm; the third layer being formed by silica aerogel; and the first and second layers containing no $Al_2O_3$.

7 Claims, 10 Drawing Sheets

(56) References Cited

U.S. PATENT DOCUMENTS

| | | | |
|---|---|---|---|
| 7,085,219 B2 * | 8/2006 | Ohta | G11B 7/1275 369/112.22 |
| 7,619,821 B2 | 11/2009 | Yamada et al. | |
| 2008/0002259 A1 | 1/2008 | Ishizawa et al. | |
| 2009/0087665 A1 | 4/2009 | Suzuki et al. | |
| 2009/0168184 A1 | 7/2009 | Yamada et al. | |
| 2009/0219620 A1 | 9/2009 | Yamada et al. | |
| 2009/0220774 A1 * | 9/2009 | Imai | G02B 1/11 428/331 |
| 2009/0244709 A1 * | 10/2009 | Suzuki | C03C 1/008 359/601 |
| 2011/0122497 A1 | 5/2011 | Ishizawa et al. | |
| 2012/0058261 A1 | 3/2012 | Ishizawa et al. | |
| 2014/0009835 A1 * | 1/2014 | Shibuya | G02B 1/111 359/586 |

FOREIGN PATENT DOCUMENTS

| | | |
|---|---|---|
| JP | 2002-107501 | 4/2002 |
| JP | 2008-096701 | 4/2008 |
| JP | 2009-008901 | 1/2009 |
| JP | 2009-075583 | 4/2009 |
| JP | 2009-162989 | 7/2009 |
| JP | 2009-168852 | 7/2009 |
| JP | 2009-168986 | 7/2009 |
| JP | 2009-193029 | 8/2009 |
| JP | 2009-210733 | 9/2009 |
| JP | 2009-230121 | 10/2009 |
| JP | 2012-018286 | 1/2012 |
| JP | 2012-078597 | 4/2012 |
| WO | WO 2006-030848 | 3/2006 |

OTHER PUBLICATIONS

Notice of Reasons for Rejection for JP application No. 2013-241422 dated Jul. 18, 2017.

* cited by examiner

ANTI-REFLECTION COATING AND OPTICAL MEMBER COMPRISING SAME

The present application is a divisional of U.S. patent application Ser. No. 14/453,193 filed on Aug. 6, 2014—the disclosure of which is incorporated herein by reference in its entirety—which claims priority from Japanese Patent Application No. 2013-241422 filed on Nov. 22, 2013, and from Japanese Patent Application No. 2013-173437 filed on Aug. 23, 2013.

FIELD OF THE INVENTION

The present invention relates to an anti-reflection coating having a three- or four-layer structure containing no $Al_2O_3$, and an optical member comprising the anti-reflection coating.

BACKGROUND OF THE INVENTION

A high-performance, single-focus or zoom lens unit for photograph cameras, broadcasting cameras, etc. generally has about 5-40 lenses in a lens barrel. There are also wide-angle lenses for wide image, which have large incident angles of light beams in peripheral portions. Also, a lens having a small radius of curvature to its effective diameter is sometimes disposed in a light path for optical design. Formed on optical members such as these lenses are multilayer, anti-reflection coatings comprising a combination of dielectric films having different refractive indices for utilizing interference effects with dielectric film thickness of ½λ or ¼λ to a center wavelength λ.

JP 2009-193029 A discloses an anti-reflection coating comprising a first layer of alumina having an optical thickness of 97.0-181.0 nm, a second layer having an optical thickness of 124.0-168.5 nm and a refractive index of 1.33-1.50, which is made of at least one selected from $MgF_2$, $SiO_2$ and $Al_2O_3$, and a third layer of porous silica having an optical thickness of 112.5-169.5 nm formed in this order on a substrate having a refractive index of 1.60-1.93 to light in a wavelength range of 400-700 nm, the first and second layers being formed by a vacuum vapor deposition method, and the third layer being formed by a sol-gel method. JP 2009-193029 A describes that this anti-reflection coating has excellent anti-reflection characteristics, with alumina used in the first layer preventing the weathering of the substrate surface.

The anti-reflection coating described in JP 2009-193029 A comprises a porous silica layer having a refractive index of 1.07-1.18 as the third layer, as is clear from Examples. However, it is difficult to stably produce a porous silica layer having extremely high porosity for such a low refractive index. When the porous silica layer has a refractive index of more than 1.18, an optimum anti-reflection coating cannot be obtained by the structure described in JP 2009-193029 A.

JP 2009-210733 A discloses an anti-reflection coating comprising a first layer of alumina having an optical thickness of 25.0-250.0 nm, a second layer having an optical thickness of 100.0-145.0 nm and a refractive index of 1.40-1.50, which is made of at least one selected from $MgF_2$, $SiO_2$ and $Al_2O_3$, and a third layer of porous silica having an optical thickness of 100.0-140.0 nm formed in this order on a substrate having a refractive index of 1.53 or more and less than 1.60 to light in a wavelength range of 400-700 nm, the first and second layers being formed by a vacuum vapor deposition method, and the third layer being formed by a sol-gel method. JP 2009-210733 A describes that this anti-reflection coating has excellent anti-reflection characteristics, with alumina used in the first layer preventing the weathering of the substrate surface. However, because this anti-reflection coating fails to exhibit optimum anti-reflection performance when formed on a substrate having a refractive index of 1.60 or more, further improvement is desired.

JP 10-319209 A discloses a method for producing an anti-reflection coating on a substrate, which comprises the steps of forming a first anti-reflection layer of a first material by a wet or dry process, and forming a second anti-reflection layer of a second material on the first anti-reflection layer by a wet process. It describes that one or more anti-reflection layers may be additionally formed under the first anti-reflection layer by a wet or dry process, the dry process being selected from vacuum vapor deposition, sputtering and CVD, and the wet process comprises a sol-gel process. It further describes that such method provides an anti-reflection coating having high performance such as low reflectance, and wide wavelength and angle ranges of anti-reflection, particularly in an ultraviolet range, with a small number of layers.

JP 10-319209 A discloses an anti-reflection coating having two-layer structure comprising a first layer of $SiO_2$ (dry process) and a second layer of porous $SiO_2$ (sol-gel method), and an anti-reflection coating having a three-layer structure comprising a first layer of $LaF_3$, $NdF_3$ or $GdF_3$ (dry process), a second layer of $SiO_2$ (wet or dry process), and a third layer of porous $SiO_2$ (sol-gel method). However, because this anti-reflection coating has insufficient weathering-preventing effects, further improvement is desired.

Further, when these anti-reflection coatings are formed on lens substrates having maximum inclination angles of 30° or more, their anti-reflection performance is extremely poor in portions having large inclination angles, failing to obtain sufficient anti-reflection effects. Accordingly, the development of anti-reflection coatings suitable for lens surfaces having such large inclination angles is desired.

JP 2012-18286 A discloses an optical member comprising an anti-reflection coating comprising first and second layers formed on a substrate by a dry process, and a third layer of silica aerogel formed by a wet process, to light in a wavelength range of 550 nm, the refractive index of the substrate being higher than that of the first layer and 1.9 or less, the refractive index A of the third layer being in a range of 1.18-1.32, the first to third layers having refractive indices decreasing in this order from the first layer, and the optical thickness Y of the second layer meeting the conditions of −750A+945≤Y≤−750A+1020, and 20≤Y≤120. JP 2012-18286 A further describes that to have high adhesion, and to prevent the weathering of optical glass substrate surfaces, a material forming the first layer is preferably $Al_2O_3$. It has been found, however, that when this optical member is stored under high-temperature, high-humidity conditions for a long period of time, the anti-reflection coating suffers fogging, resulting in deteriorated spectral reflection characteristics.

OBJECTS OF THE INVENTION

Accordingly, the first object of the present invention is to provide an anti-reflection coating having high anti-reflection performance, with excellent storage stability for a long period of time.

The second object of the present invention is to provide an inexpensive optical member comprising an anti-reflection coating, whose anti-reflection performance is not poor even in a peripheral portion of a lens having a small radius of curvature to its effective diameter (having a large surface inclination angle).

DISCLOSURE OF THE INVENTION

As a result of intensive research in view of the above objects, the inventors have found that (1) in the optical member described in JP 2012-18286 A, the cause of fogging generated when it is stored under high-temperature, high-humidity conditions for a long period of time is a reaction of $Al_2O_3$ forming the first layer with materials used for the third layer (silica aerogel coating solution and alkali treatment solution), and that (2) excellent anti-reflection characteristics with no fogging which would occur when stored under high-temperature, high-humidity conditions for a long period of time are obtained without using an $Al_2O_3$ layer, when (a) in a three-layer, anti-reflection coating having an uppermost silica aerogel layer, the refractive index of the second layer is set higher than those of the first and third layers, or when (b) in a four-layer, anti-reflection coating having an uppermost silica aerogel layer, the refractive indices of the first to third layers are adjusted. The present invention has been completed based on such findings.

Thus, the first anti-reflection coating of the present invention has a three-layer structure comprising first to third layers formed in this order on a substrate, the substrate having a refractive index of 1.6-1.9, the first layer having a refractive index of 1.37-1.57, the second layer having a refractive index of 1.75-2.5, and the third layer having a refractive index of 1.18-1.32, to light in a wavelength range of 550 nm;

the third layer being formed by silica aerogel; and the first and second layers containing no $Al_2O_3$.

The first optical member of the present invention comprises the first anti-reflection coating on a lens substrate, whose effective diameter D and radius R of curvature meet the condition of 0.1≤D/R≤2.

In the first anti-reflection coating and the first optical member, the first and second layers are preferably formed by a dry process, the third layer is preferably formed by a wet process, and the wet process preferably includes a sol-gel method.

In the first optical member, the lens substrate preferably has the maximum inclination angle of 30-65°.

In the first optical member, the optical thickness $D1(\theta_t)$ of the first layer and the optical thickness $D2(\theta_t)$ of the second layer at an arbitrary inclination angle $\theta_t$ of the lens substrate are preferably expressed by the following formulae (1) and (2):

$$D1(\theta_t)=D1_0\times(\cos\theta_t)^\alpha \quad (1), \text{ and}$$

$$D2(\theta_t)=D2_0\times(\cos\theta_t)^\beta \quad (2),$$

wherein $D1_0$ and $D2_0$ represent the optical thickness of the first and second layers at a center of the lens substrate, and α and β are numbers independently in a range of 0-1.

In the first optical member, the thickness of the third layer is preferably constant regardless of the inclination angle of the lens substrate, or larger in a peripheral portion of the lens substrate than at a center of the lens substrate.

The second anti-reflection coating of the present invention has a four-layer structure comprising first to fourth layers formed in this order on a substrate, the substrate having a refractive index of 1.6-1.9, the first layer having a refractive index of 1.37-1.57, the second layer having a refractive index of 1.75-2.5, the third layer having a refractive index of 1.37-1.57, and the fourth layer having a refractive index of 1.18-1.32, to light in a wavelength range of 550 nm;

the fourth layer being formed by silica aerogel; and the first to third layers containing no $Al_2O_3$.

The second optical member of the present invention comprises the second anti-reflection coating on a lens substrate, whose effective diameter D and radius R of curvature meet the condition of 0.1≤D/R≤2.

The third anti-reflection coating of the present invention has a four-layer structure comprising first to fourth layers formed in this order on a substrate, the substrate having a refractive index of 1.6-1.9, the first layer having a refractive index of 1.75-2.5, the second layer having a refractive index of 1.37-1.57, the third layer having a refractive index of 1.75-2.5, and the fourth layer having a refractive index of 1.18-1.32, to light in a wavelength range of 550 nm;

the fourth layer being formed by silica aerogel; and the first to third layers containing no $Al_2O_3$.

The third optical member of the present invention comprises the third anti-reflection coating on a lens substrate, whose effective diameter D and radius R of curvature meet the condition of 0.1≤D/R≤2.

In the second and third anti-reflection coatings and the second and third optical members, the first to third layers are preferably formed by a dry process, the fourth layer is preferably formed by a wet process, and the wet process preferably includes a sol-gel method.

In the second and third optical members, the lens substrate preferably has the maximum inclination angle of 30-65°.

In the second and third optical members, the optical thickness $D1(\theta_t)$ of the first layer, the optical thickness $D2(\theta_t)$ of the second layer and the optical thickness $D3(\theta_t)$ of the third layer at an arbitrary inclination angle $\theta_t$ of the lens substrate are preferably expressed by the following formulae (1) to (3):

$$D1(\theta_t)=D1_0\times(\cos\theta_t)^\alpha \quad (1),$$

$$D2(\theta_t)=D2_0\times(\cos\theta_t)^\beta \quad (2), \text{ and}$$

$$D3(\theta_t)=D3_0\times(\cos\theta_t)^\gamma \quad (3),$$

wherein $D1_0$, $D2_0$ and $D3_0$ represent the optical thickness of the first to third layers at a center of the lens substrate, and α, β and γ are numbers independently in a range of 0-1.

In the second and third optical members, the thickness of the fourth layer is preferably constant regardless of the inclination angle of the lens substrate, or larger in a peripheral portion of the lens substrate than at a center of the lens substrate.

BRIEF DESCRIPTION OF THE DRAWINGS

FIG. 4(*b*) is a schematic cross-sectional view showing the incident angle of light beams at a point other than the center point of the optical member.

DESCRIPTION OF THE PREFERRED EMBODIMENTS

The present disclosure relates to subject matter contained in Japanese Patent Application No. 2013-173437 filed on Aug. 23, 2013 and Japanese Patent Application No. 2013-241422 filed on Nov. 22, 2013, which are expressly incorporated herein by reference in their entirety.

The present invention will be explained in detail below referring to the attached drawings. Explanations of each embodiment will be applicable to other embodiments unless otherwise mentioned. Please note that the refractive index of each layer in the anti-reflection coating is determined to light in a wavelength range of 550 nm, unless otherwise mentioned, and that in the attached drawings, the thickness of each layer is exaggerated to make clear the layer structure of the anti-reflection coating.

[1] FIRST ANTI-REFLECTION COATING (1) LAYER STRUCTURE

Figure 1:
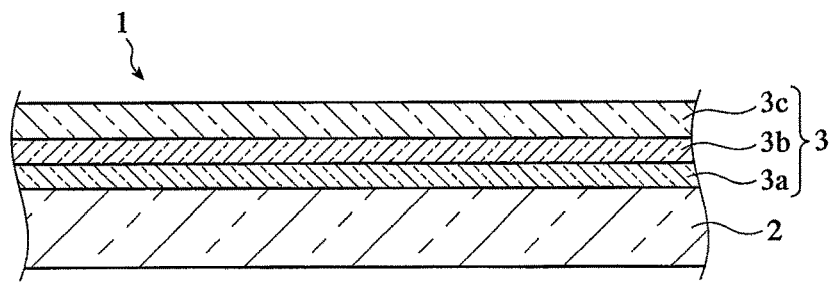
FIG. 1 is a schematic cross-sectional view showing one example of the optical members of the present invention.

FIG. 1 shows an example of first anti-reflection coatings 3 having a three-layer structure comprising a first layer 3a, a second layer 3b and a third layer 3c formed in this order on the substrate 2. In the first anti-reflection coating 3, the first layer 3a has a refractive index of 1.37-1.57, the second layer 3b has a refractive index of 1.75-2.5, and the third layer 3c has a refractive index of 1.18-1.32. With such structure that the refractive index of the second layer is larger than those of the first and third layers, excellent anti-reflection performance can be obtained on a substrate 2 having a refractive index of 1.6-1.9, without using $Al_2O_3$ (refractive index: 1.76).

The first layer is a layer containing no $Al_2O_3$. The refractive index of the first layer is 1.37-1.57, preferably 1.37-1.5, more preferably 1.37-1.48, most preferably 1.37-1.41. Accordingly, the first layer is preferably a $MgF_2$ layer. The optical thickness of the first layer is preferably 25-100 nm, more preferably 30-80 nm. The refractive index of the second layer is 1.75-2.5, preferably 1.99-2.33, more preferably 1.99-2.33. The optical thickness of the first layer at a substrate inclination angle of 0° is preferably 25-100 nm, more preferably 30-80 nm. The first layer is preferably formed by a dry process.

The second layer is a layer containing no $Al_2O_3$. The refractive index of the second layer is 1.75-2.5, preferably 1.99-2.33, more preferably 1.99-2.33, most preferably 1.99-2.3. Accordingly, the second layer is preferably made of $TaO_2+Y_2O_3+Pr_6O_{11}$. The second layer made of $TaO_2+Y_2O_3+Pr_6O_{11}$ has improved adhesion to the first and third layers. The optical thickness of the second layer at a substrate inclination angle of 0° is preferably 10-50 nm, more preferably 20-45 nm. The second layer is also preferably formed by a dry process.

The third layer is a silica aerogel layer preferably formed by a wet process. The wet process preferably includes a sol-gel method. The refractive index of the third layer is 1.18-1.32, preferably 1.18-1.30, more preferably 1.18-1.28. With the third layer having such a low refractive index, excellent anti-reflection effects can be obtained. The optical thickness of the third layer is preferably 90-140 nm, more preferably 100-135 nm.

(2) SUBSTRATE

The first anti-reflection coating 3 can be formed on a substrate having a refractive index of 1.6-1.9. The use of a substrate having such a refractive index provides an optical member having good anti-reflection performance in a wavelength range of visible light. Materials for the substrate may be optical glass such as BaSF2 (refractive index: 1.6684), SF5 (refractive index: 1.6771), LaF2 (refractive index: 1.7475), LaSF09 (refractive index: 1.8197), LaSF01 (refractive index: 1.7897), LaSF016 (refractive index: 1.7758), LAK7 (refractive index: 1.654), LAK14 (refractive index: 1.6995), etc. The substrate may be in a plate or lens shape.

(3) ANTI-REFLECTION CHARACTERISTICS

The first anti-reflection coating having a three-layer structure comprising an uppermost layer of silica aerogel, with a higher refractive index in the second layer than in the first and third layers, has excellent anti-reflection characteristics in wide ranges of wavelength and angle without using an $Al_2O_3$ layer, free from fogging which would occur in conventional anti-reflection coatings comprising a silica aerogel layer and an $Al_2O_3$ layer, when stored under high-temperature, high-humidity conditions for a long period of time.

[2] FIRST OPTICAL MEMBER

Figure 2:
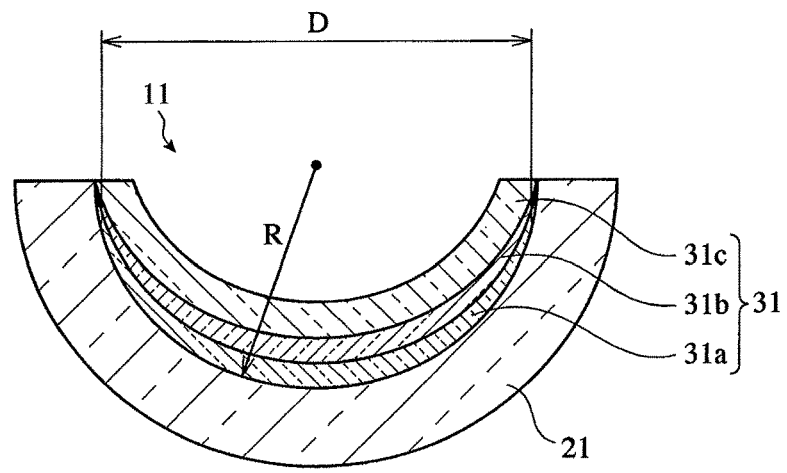
FIG. 2 is a schematic cross-sectional view showing another example of the optical members of the present invention.
Figure 5:
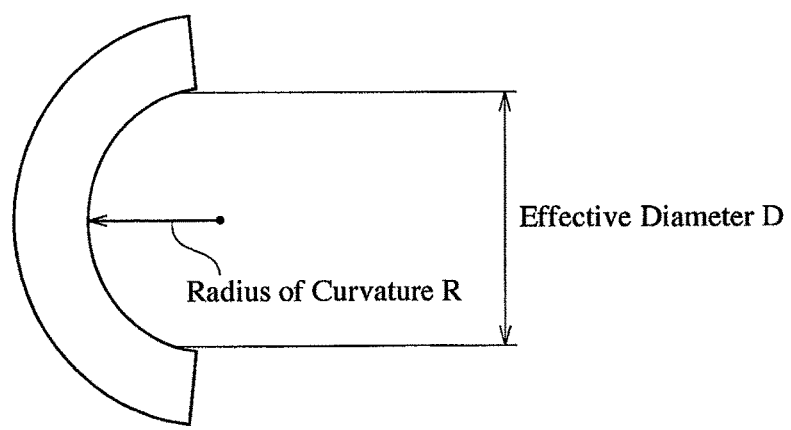
FIG. 5 is a schematic cross-sectional view showing the effective diameter and radius of curvature of a lens in the optical member.

FIG. 2 shows an example of first optical members 11 comprising the first anti-reflection coating 31 formed on a lens substrate 21. The lens substrate 21 has an effective diameter D and a radius R of curvature, whose ratio D/R is 0.1≤D/R≤2. As shown in FIG. 5, the effective diameter D is the maximum diameter of a lens effectively usable as an optical member, and the radius R of curvature is a radius of the curved lens surface when it is approximated to a sphere. The use of a lens substrate having a ratio D/R of 0.1-2 provides more effects of the present invention. Also, the use of a lens substrate having the maximum inclination angle of 30-65°, particularly 30-60°, provides more effects of the present invention.

Each of the first and second layers 31a, 31b preferably has thickness gradually decreasing as it goes from a center portion to a peripheral portion in the lens substrate 21. The first and second layers 31a, 31b are the same as the first and second layers 3a, 3b in the first anti-reflection coating 3 except for the thickness variation. Specifically, the optical thickness $D1(\theta_t)$ of the first layer 31a and the optical thickness $D2(\theta_t)$ of the second layer 31b at an arbitrary inclination angle $\theta_t$ of the lens substrate 21 are preferably expressed by the following formulae (1) and (2):

$$D1(\theta_t)=D1_0 \times (\cos \theta_t)^\alpha \quad (1), \text{ and}$$

$$D2(\theta_t)=D2_0 \times (\cos \theta_t)^\beta \quad (2),$$

wherein $D1_0$ and $D2_0$ represent the optical thickness of the first and second layers 31a, 31b at a center of the lens substrate 21, and $\alpha$ and $\beta$ are numbers independently in a range of 0-1. $\alpha$ and $\beta$ are more preferably independently in a range of 0.5-0.95, most preferably independently in a range of 0.6-0.9.

With the first and second layers 31a, 31b getting thinner toward the peripheral portion, good anti-reflection is obtained regardless of the substrate inclination angle, providing an anti-reflection coating less influenced by the incident angle of light beams. It is particularly effective, when a lens substrate having the maximum inclination angle of 30° or more is used.

The optical thickness of the third layer 31c is preferably constant regardless of the lens substrate inclination angle, or larger in a peripheral portion of the lens than at a center of the lens. Except for this, the third layer 31c is the same as the third layer 3c in the first anti-reflection coating 3. The silica aerogel preferably has pore diameters of 0.005-0.2 μm and porosity of 25-60%.

Figure 3:
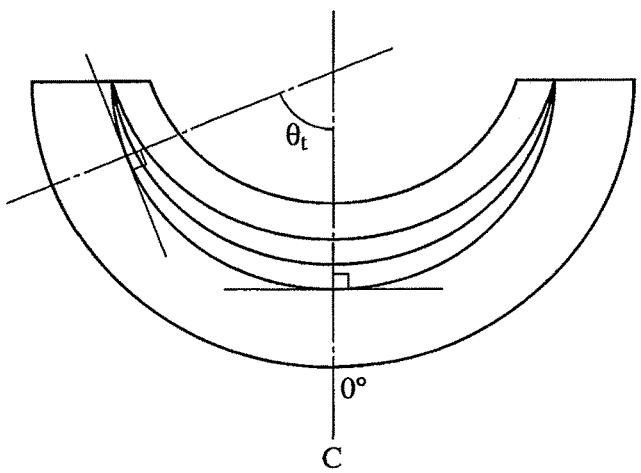
FIG. 3 is a schematic cross-sectional view showing the substrate inclination angle of the optical member.
Figure 4A:
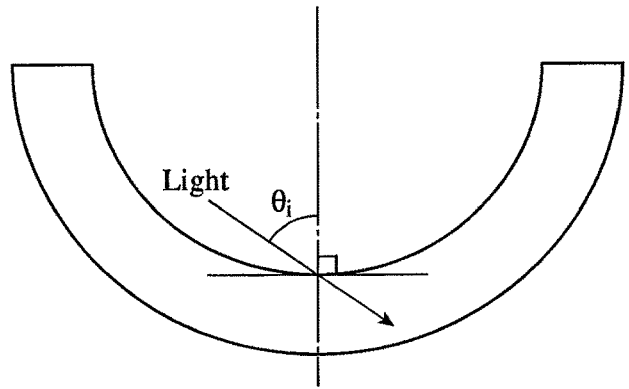
FIG. 4(*a*) is a schematic cross-sectional view showing the incident angle of light beams at a center point of the optical member.
Figure 4B:
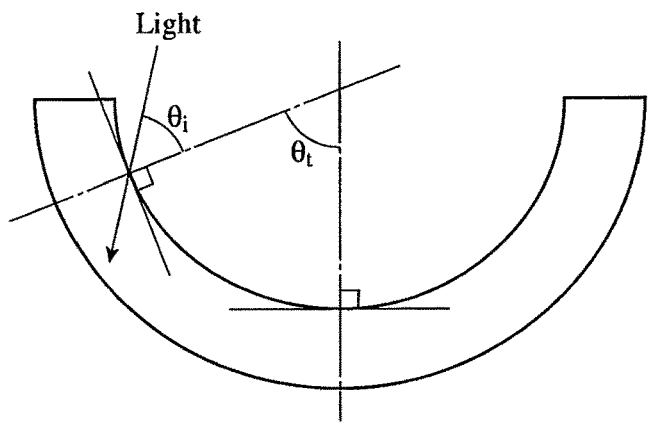

As shown in FIG. 3, the substrate inclination angle is an angle $\theta_t$ of a normal line at an arbitrary point on the lens surface to a center axis C of the lens, which is 0° at a center of the lens, and larger at a position nearer a periphery of the lens. The incident angle $\theta_i$ of light beams at an arbitrary point on the lens surface is an angle of the light beams to a normal line at the above point. The incident angle $\theta_i$ is shown at a center of the lens having a substrate inclination angle of 0° in FIG. 4(a), and in a portion having a substrate inclination angle of $\theta_t$ in FIG. 4(b).

[3] PRODUCTION OF FIRST OPTICAL MEMBER (1) FORMATION OF FIRST AND SECOND LAYERS

The first and second layers in the anti-reflection coating are formed by a dry process. The dry process may be, for example, a physical vapor deposition method such as a vacuum vapor deposition method, a sputtering method, an ion plating method, etc., or a chemical vapor deposition method such as thermal CVD, plasma CVD, photo CVD, etc. These methods may be combined, if necessary. The vacuum vapor deposition method is particularly preferable from the aspect of production cost and precision.

Figure 21:
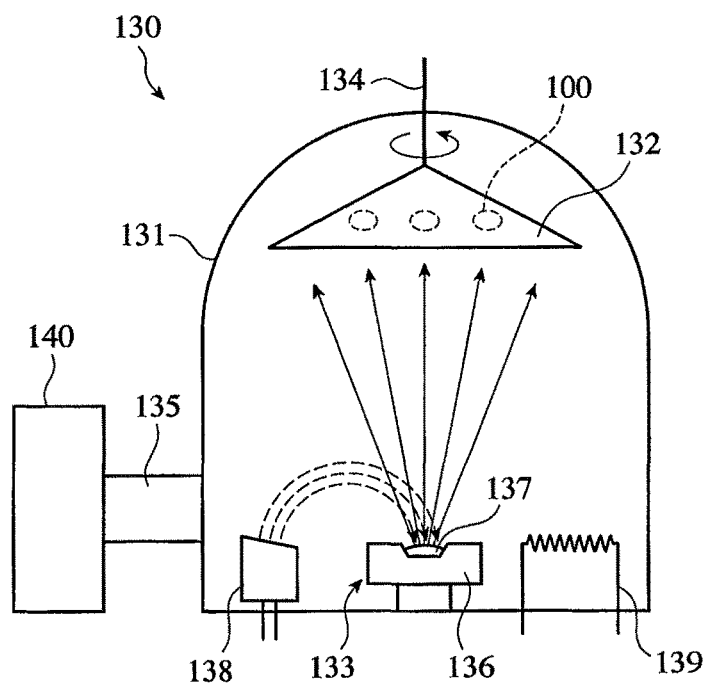
FIG. 21 is a schematic view showing one example of apparatuses for forming an anti-reflection coating by vacuum vapor deposition.

The vacuum vapor deposition method may use resistor heating, electron beams, etc. The vacuum vapor deposition method using electron beams will be explained below. As shown in FIG. 21, an electron-beam-type vacuum vapor deposition apparatus 130 comprises, in a vacuum chamber 131, a rotary rack 132 for supporting pluralities of substrates 100 on its inner surface, a vapor deposition source 133 comprising a crucible 136 for a vapor deposition material 137, an electron beam ejector 138, a heater 139, and a pipe 135 connected to a vacuum pump 140. The substrates 100 are placed on the rotary rack 132 with their surfaces opposing the vapor deposition source 133. The vapor deposition material 137 is evaporated by heating by the irradiation of electron beams from the electron beam ejector 138. With the vacuum chamber 131 evacuated by the vacuum pump 140, anti-reflection coatings are formed by accumulating a vapor of the vapor deposition material 137 on the substrates 100. To form uniform vapor deposited films, the rotary rack 132 is rotated around a rotary shaft 134 while heating the substrates 100 by the heater 139.

When the lens substrates are vapor-deposited by the vacuum vapor deposition apparatus, the thickness of each layer from a center of the lens substrate to the peripheral portion can be controlled by adjusting the positions of the lens substrates and the vapor deposition source 133, the intensity of electron beams, the degree of vacuum, etc.

In the vacuum vapor deposition method, the initial degree of vacuum is preferably $1.0 \times 10^{-6}$ to $1.0 \times 10^{-5}$ Torr. Outside the above range of the degree of vacuum, vapor deposition takes too much time, resulting in low production efficiency, or insufficient vapor deposition to complete the film formation. The temperature of the substrates 100 during vapor deposition can be properly determined depending on the heat resistance of the substrates and the vapor deposition speed, though it is preferably 60-250° C.

(2) FORMATION METHOD OF THIRD LAYER

The third layer in the anti-reflection coating is preferably formed by a dry process, particularly a sol-gel method. The silica aerogel layer formed by a sol-gel method has an extremely lower refractive index than that of a $MgF_2$ layer (n=1.39), enabling an anti-reflection coating having an extremely low reflectance in wide wavelength and incident angle ranges, which would be difficult conventionally.

For example, when a $MgF_2$ layer is formed as the third layer on the lens substrate by vacuum vapor deposition, the third layer also has thickness gradually decreasing toward a peripheral portion of the lens, like the first and second layers. Accordingly, all of the first to third layers are thinner in a peripheral portion of the lens having a large inclination angle, failing to obtain good anti-reflection performance.

Though known sol-gel methods may be used, a preferable sol-gel method for forming the third silica aerogel layer comprises the steps of (i) preparing a first acidic sol having a median diameter of 100 nm or less by mixing an alkaline sol, which is prepared by the hydrolysis and polycondensation of alkoxysilane in the presence of a basic catalyst, with an acidic solution, (ii) preparing a second acidic sol having a median diameter of 10 nm or less by the hydrolysis and polycondensation of alkoxysilane in the presence of an acidic catalyst, (iii) mixing the first and second acidic sols, (iv) applying the resultant mixed sol to a lens substrate provided with the first and second layers, drying the resultant coating, (v) subjecting it to an alkali treatment, (vi) washing it, and (vii) subjecting it to a humid treatment.

(i) Preparation of First Acidic Sol (a) Alkoxysilane

Alkoxysilane for the first acidic sol is preferably a monomer or oligomer (polycondensate) of tetraalkoxysilane. The use of a four-functional alkoxysilane enables the production of a sol of colloidal silica particles having relatively large particle sizes. Tetraalkoxysilane is preferably represented by $Si(OR)_4$, wherein R is an alkyl group having 1-5 carbon atoms (methyl, ethyl, propyl, butyl, etc.), or an acyl group having 1-4 carbon atoms (acetyl, etc.). Specific examples of tetraalkoxysilanes include tetramethoxysilane, tetraethoxysilane, tetrapropoxysilane, tetrabutoxysilane, diethoxydimethoxysilane, etc. Among them, tetramethoxysilane and tetraethoxysilane are preferable. Within a range not hindering the effects of the present invention, a small amount of three-or-less-functional alkoxysilane may be added to tetraalkoxysilane.

(b) Hydrolysis and Polycondensation in Presence of Basic Catalyst

Hydrolysis and polycondensation proceed by adding an organic solvent, a basic catalyst and water to alkoxysilane. The organic solvent is preferably alcohol such as methanol, ethanol, n-propanol, i-propanol, butanol, etc., more preferably methanol or ethanol. The basic catalyst is preferably ammonia, amine, NaOH or KOH. The preferred amines are alcohol amines or alkyl amines (methylamine, dimethylamine, trimethylamine, n-butylamine, n-propylamine, etc.).

A ratio of the organic solvent to the alkoxysilane is preferably set such that the concentration of the alkoxysilane is 0.1-10% by mass as $SiO_2$ (silica concentration). When the concentration of silica is more than 10% by mass, silica particles have too large particle sizes in the resultant sol. On the other hand, when the concentration of silica is less than 0.1, silica particles have too small particle sizes in the resultant sol. The organic solvent/alkoxysilane molar ratio is preferably in a range of 1 to $10^4$.

The basic catalyst/alkoxysilane molar ratio is preferably $1 \times 10^{-4}$ to 1, more preferably $1 \times 10^{-4}$ to 0.8, particularly $3 \times 10^{-4}$ to 0.5. With the basic catalyst/alkoxysilane molar ratio of less than $1 \times 10^{-4}$, a sufficient hydrolysis reaction of alkoxysilane does not occur. On the other hand, when the molar ratio exceeds 1, a catalytic effect is saturated.

The water/alkoxysilane molar ratio is preferably 0.1-30. When the water/alkoxysilane molar ratio is more than 30, a hydrolysis reaction proceeds too fast, making the control of the reaction difficult, making it unlikely to form a uniform silica aerogel layer. On the other hand, when it is less than 0.1, sufficient hydrolysis of alkoxysilane does not occur.

An alkoxysilane solution containing a basic catalyst and water is preferably aged by leaving it to stand or slowly stirring at 10-90° C. for about 10-60 hours. By aging, hydrolysis and polycondensation proceed, forming a silica sol. The silica sol includes not only a dispersion of colloidal silica particles, but also a dispersion of colloidal silica particles agglomerated in a cluster.

(c) Hydrolysis and Polycondensation in Presence of Acidic Catalyst

The resultant alkaline sol is mixed with an acidic catalyst, and if necessary, water and an organic solvent are added, so that hydrolysis and polycondensation further proceed in an acidic state. The acidic catalyst includes hydrochloric acid, nitric acid, sulfuric acid, phosphoric acid, acetic acid, etc. The organic solvent used may be the same as described above. In the first acidic sol, a molar ratio of the acidic catalyst to the basic catalyst is preferably 1.1-10, more preferably 1.5-5, most preferably 2-4. When the molar ratio of the acidic catalyst to the basic catalyst is less than 1.1, sufficient polymerization with the acidic catalyst does not proceed. On the other hand, when it exceeds 10, a catalytic effect is saturated. The organic solvent/alkoxysilane molar ratio and the water/alkoxysilane molar ratio may be the same as described above. The sol containing the acidic catalyst is preferably aged by leaving it to stand or slowly stirring at 10-90° C. for about 15 minutes to 24 hours. By aging, hydrolysis and polycondensation proceed, thereby forming the first acidic sol.

Silica particles in the first acidic sol have a median diameter of 100 nm or less, preferably 10-50 nm. The median diameter is measured by a dynamic light scattering method.

(ii) Preparation of Second Acidic Sol (a) Alkoxysilane

Alkoxysilane for the second acidic sol may be a 2-to-4-functional alkoxysilane represented by $Si(OR^1)_x(R^2)_{4-x}$, wherein x is an integer of 2-4. $R^1$ is preferably an alkyl group having 1-5 carbon atoms (methyl, ethyl, propyl, butyl, etc.), or an acyl group having 1-4 carbon atoms (acetyl, etc.). $R^2$ is preferably an organic group having 1-10 carbon atoms, for example, a hydrocarbon group such as methyl, ethyl, propyl, butyl, hexyl, cyclohexyl, octyl, decyl, phenyl, vinyl, allyl, etc., and a substituted hydrocarbon group such as γ-chloropropyl, $CF_3CH_2$—, $CF_3CH_2CH_2$—, $C_2F_5CH_2CH_2$—, $C_3F_7CH_2CH_2CH_2$—, $CF_3OCH_2CH_2CH_2$—, $C_2F_5OCH_2CH_2CH_2$—, $C_3F_7OCH_2CH_2CH_2$—, $(CF_3)_2CHOCH_2CH_2CH_2$—, $C_4F_9CH_2OCH_2CH_2CH_2$—, 3-(perfluorocyclohexyloxy)propyl, $H(CF)_4CH_2OCH_2CH_2CH_2$—, $H(CF)_4CH_2CH_2CH_2$—, γ-glycidoxypropyl, γ-mercaptopropyl, 3,4-epoxycyclohexylethyl, γ-methacryloyloxypropyl, etc.

Specific examples of two-functional alkoxysilanes include dimethyldialkoxysilanes such as dimethyldimethoxysilane, dimethyldiethoxysilane, etc. Specific examples of three-functional alkoxysilanes include methyltrialkoxysilane such as methyltrimethoxysilane, methyltriethoxysilane, etc., and phenyltrialkoxysilane such as phenyltriethoxysilane, etc. Specific examples of four-functional alkoxysilanes include tetramethoxysilane, tetraethoxysilane, tetrapropoxysilane, tetrabutoxysilane, diethoxydimethoxysilane, etc. Alkoxysilane is preferably three-functional or more, more preferably methyltrialkoxysilane or tetraalkoxysilane.

(b) Hydrolysis and Polycondensation in Presence of Acidic Catalyst

A monomer or oligomer (polycondensate) of alkoxysilane is mixed with an organic solvent, an acidic catalyst and water, to cause the hydrolysis and polycondensation of alkoxysilane. The organic solvent and acidic catalyst used may be the same as described in the step of preparing the first acidic sol. The acidic catalyst/alkoxysilane molar ratio is preferably $1 \times 10^{-4}$ to 1, more preferably $1 \times 10^{-4}$ to $3 \times 10^{-2}$, most preferably $3 \times 10^{-4}$ to $1 \times 10^{-2}$. The organic solvent/ alkoxysilane molar ratio and the water/alkoxysilane molar ratio may be the same as described in the step of preparing the first acidic sol.

An alkoxysilane solution containing an acidic catalyst and water is preferably aged by leaving it to stand or slowly stirring at 10-90° C. for about 30 minutes to 60 hours. By aging, hydrolysis and polycondensation proceed, thereby forming the second acidic sol. When the aging time exceeds 60 hours, the median diameter of silica particles in the sol have becomes too large.

Colloidal silica particles in the second acidic sol have a smaller median diameter than that of colloidal silica particles in the first acidic sol. The median diameter of colloidal silica particles in the second acidic sol is 10 nm or less, preferably 1-5 nm. A median diameter ratio of silica particles in the first acidic sol to those in the second acidic sol is preferably 5-50, more preferably 5-35. With the median diameter ratio of less than 5 or more than 50, the resultant silica aerogel layer has low scratch resistance.

(iii) Preparation of Mixed Sol

The first acidic sol is preferably mixed with the second acidic sol at 1-30° C. for about 1 minute to 6 hours, while slowly stirring. If necessary, the mixture may be heated at 80° C. or lower. A solid component mass ratio of the first acidic sol to the second acidic sol is preferably 5-90, more preferably 5-80. With the solid component mass ratio of less than 5 or more than 90, the resultant silica aerogel layer has low scratch resistance.

(iv) Coating and Drying (a) Coating

The mixed sol is coated to the lens substrate provided with the first and second layers. The coating method includes a dip-coating method, a spray-coating method, a spin-coating method, a printing method, etc. When a three-dimensional structure like a lens is coated, a spin-coating method or a dipping method is preferable, and a spin-coating method is particularly preferable. The physical thickness of the resultant gel can be controlled by adjusting the rotation speed of the substrate, the concentration of the mixed sol, etc. in the spin-coating method. The rotation speed of the substrate in the spin-coating method is preferably about 1,000-15,000 rpm.

To adjust the concentration and flowability of the mixed sol for higher coatability, the above organic solvent may be added as a dispersant. The concentration of silica in the mixed sol is preferably 0.1-20% by mass. If necessary, the mixed sol may be subjected to an ultrasonic treatment to prevent the agglomeration of colloid particles. The ultrasonic waves preferably have a frequency of 10-30 kHz and a power of 300-900 W, and the treatment time is preferably 5-120 minutes.

(b) Drying

The drying conditions of the coating are properly selected depending on the heat resistance of the substrate. To accelerate the polycondensation reaction, the coating may be heat-treated at a temperature lower than the boiling point of water for 15 minutes to 24 hours, and then at a temperature of 100-200° C. for 15 minutes to 24 hours. The heat-treated silica aerogel layer exhibits high scratch resistance.

(v) Alkali Treatment

The silica aerogel layer is treated with an alkali to improve its scratch resistance. The alkali treatment is preferably conducted by applying an alkali solution to the silica aerogel layer, or by placing the silica aerogel layer in an ammonia atmosphere. Solvents for the alkali solution can be properly selected depending on the type of the alkali, preferably water, alcohol, etc. The concentration of the alkali solution is preferably $1 \times 10^{-4}$ to 20 N, more preferably $1 \times 10^{-3}$ to 15 N.

The alkalis may be inorganic alkalis such as sodium hydroxide, potassium hydroxide, ammonia, etc.; inorganic alkali salts such as sodium carbonate, sodium hydrogen carbonate, ammonium carbonate, ammonium hydrogen carbonate, etc.; organic alkalis such as monomethylamine, dimethylamine, trimethylamine, monoethylamine, diethylamine, triethylamine, n-propylamine, di-n-propylamine, n-butylamine, di-n-butylamine, n-amylamine, n-hexylamine, laurylamine, ethylenediamine, hexamethylenediamine, anilene, methylanilene, ethylanilene, cyclohexylamine, dicyclohexylamine, pyrrolidine, pyridine, imidazole, guanidine, tetramethylammonium hydroxide, tetraethylammonium hydroxide, tetrabutylammonium hydroxide, monoethanolamine, diethanolamine, triethanolamine, choline, etc.; organic acid-alkali salts such as ammonium formate, ammonium acetate, monomethylamine formate, dimethylamine acetate, anilene acetate, pyridine lactate, guanidinoacetate, etc.

10-200 ml of the alkali solution is preferably applied per 1 cm$^2$ of the silica aerogel layer. The coating of the alkali solution can be conducted by the same method as coating the silica aerogel layer, preferably by a spin-coating method. The substrate is rotated preferably at about 1,000-15,000 rpm in the spin-coating method. The layer coated with the alkali solution is left to stand preferably at 1-40° C., more preferably at 10-30° C. The leaving time is preferably 0.1-10 hours, more preferably 0.2-1 hours.

In the case of the ammonia atmosphere, the silica aerogel layer is preferably alkali-treated in an ammonia gas partial pressure of $1 \times 10^{-1}$ to $1 \times 10^5$ Pa. The treatment temperature is preferably 1-40° C., more preferably 10-30° C. The treatment time is preferably 1-170 hours, more preferably 5-80 hours.

If necessary, the alkali-treated silica aerogel layer is preferably dried at a temperature of 50-200° C. for 15 minutes to 24 hours.

(vi) Washing

The alkali-treated silica aerogel layer is washed, if necessary. Washing is preferably conducted by a method of immersing the alkali-treated silica aerogel layer in water and/or an alcohol, a method of showering water and/or an alcohol to the alkali-treated silica aerogel layer, or their combination. An ultrasonic treatment may be conducted during immersion. The washing temperature is preferably 1-40° C., and the washing time is preferably 0.2-15 minutes. In washing, 0.01-1,000 ml of water and/or an alcohol is preferably used per 1 cm$^2$ of the silica aerogel layer. The washed silica aerogel layer is preferably dried at a temperature of 50-200° C. for 15 minutes to 24 hours. The alcohol is preferably methanol, ethanol or isopropyl alcohol.

(vii) Humid Treatment

The silica aerogel layer after coating, the alkali treatment or washing is subject to a humid treatment under high-humidity conditions. It is presumed that the hydrolysis of unreacted alkoxysilane and the polycondensation reaction of silanol groups occur by the humid treatment, providing the silica aerogel layer with improved mechanical strength, while suppressing the variation of the refractive index of the layer with time.

The humid treatment is conducted by placing the substrate having the silica aerogel layer in an environment at a temperature of 35° C. or higher and at relative humidity of 70% or more for 1 hour or more. The humidity of less than 70% RH would not provide sufficient treatment effects. The humidity is preferably 75% RH or more, more preferably 80% RH or more, most preferably 90% RH or more. The treatment temperature is preferably 35-90° C., more preferably 40-80° C., most preferably 50-80° C. The treatment temperature of lower than 35° C. would not provide sufficient effects, and the treatment temperature of higher than 90° C. would saturate the effects. To obtain the above the effects, the treatment time is 1 hour or more, preferably 5-120 hours, more preferably 5-48 hours, though variable depending on the temperature and humidity conditions. With the treatment time of more than 120 hours, the above effects would be saturated.

[4] SECOND AND THIRD ANTI-REFLECTION COATINGS (1) LAYER STRUCTURE

Figure 6:
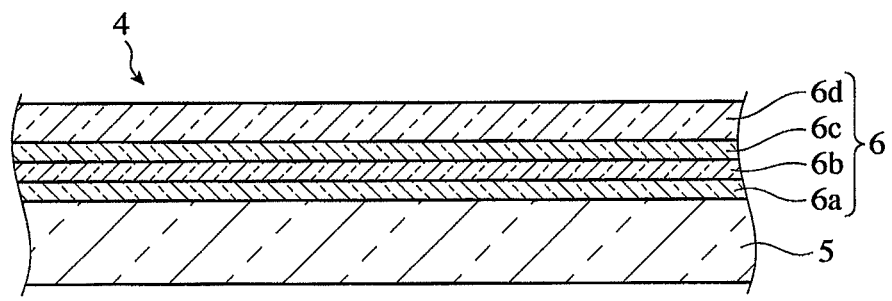
FIG. 6 is a schematic cross-sectional view showing a further example of the optical members of the present invention.

FIG. 6 shows an optical member 4 having a four-layer structure comprising a substrate 5, and an anti-reflection coating 6 comprising first to fourth layers 6a, 6b, 6c, 6d formed in this order on the substrate 5. The anti-reflection coating 6 has two types of structures described below, on the substrate 5 having a refractive index of 1.6-1.9.

(i) Second Anti-Reflection Coating

The second anti-reflection coating 6 comprises a first layer 6a having a refractive index of 1.37-1.57, a second layer 6b having a refractive index of 1.75-2.5, a third layer 6c having a refractive index of 1.37-1.57, and a fourth layer 6d having a refractive index of 1.18-1.32. With the first to fourth layers having such refractive indices, the second anti-reflection coating 6 formed on a substrate 5 having a refractive index of 1.6-1.9 exhibits excellent anti-reflection without using $Al_2O_3$ (refractive index: 1.64).

The first to third layers 6a, 6b, 6c are layers containing no $Al_2O_3$, and the fourth layer 6d is a silica aerogel layer. The first to third layers 6a, 6b, 6c are preferably formed by a dry process, and the fourth layer 6d is preferably formed by a wet process. The wet process preferably includes a sol-gel method.

The refractive index of the first layer is 1.37-1.57, preferably 1.38-1.5, more preferably 1.38-1.48. The optical thickness of the first layer is preferably 8-100 nm, more preferably 10-85 nm. The refractive index of the second layer is 1.75-2.5, preferably 1.86-2.33, more preferably 1.99-2.3. The optical thickness of the second layer is preferably 8-60 nm, more preferably 10-50 nm. The refractive index of the third layer is 1.37-1.57, preferably 1.37-1.5, more preferably 1.37-1.48. The optical thickness of the third layer is preferably 8-170 nm, more preferably 10-160 nm.

Though materials forming the first and third layers may be the same or different from each other, both of them are preferably made of $SiO_2$. The first and third layers made of $SiO_2$ have improved adhesion. To improve the anti-reflection performance, the second layer is preferably made of $TaO_2+Y_2O_3+Pr_6O_{11}$.

The fourth layer is a silica aerogel layer, preferably formed by a wet process. The refractive index of the fourth layer is 1.18-1.32, preferably 1.2-1.32, more preferably 1.2-1.3. The optical thickness of the fourth layer is preferably 90-180 nm, more preferably 100-170 nm. With the outermost layer having such a low refractive index, excellent anti-reflection effects are obtained. The silica aerogel preferably has pore diameters of 0.005-0.2 μm and porosity of 25-60%.

(ii) Third Anti-Reflection Coating

The third anti-reflection coating 6 comprises a first layer 6a having a refractive index of 1.75-2.5, a second layer 6b having a refractive index of 1.37-1.57, a third layer 6c having a refractive index of 1.75-2.5, and a fourth layer 6d having a refractive index of 1.18-1.32. With the first to fourth layers having such refractive indices, the third anti-reflection coating 6 formed on the substrate 5 having a refractive index of 1.6-1.9 exhibits excellent anti-reflection without using $Al_2O_3$ having a refractive index of 1.64.

The first to third layers 6a, 6b, 6c are layers not containing $Al_2O_3$, and the fourth layer 6d is a silica aerogel layer. The first to third layers 6a, 6b, 6c are preferably formed by a dry process, and the fourth layer 6d is preferably formed by a wet process. The wet process preferably includes a sol-gel method. Because the third anti-reflection coating 6 differs from the second anti-reflection coating 6 in the first to third layers 6a, 6b, 6c, only the first to third layers 6a, 6b, 6c will be explained below.

The refractive index of the first layer is 1.75-2.5, preferably 1.86-2.33, more preferably 1.99-2.3. The optical thickness of the first layer is preferably 8-90 nm, more preferably 10-70 nm. The refractive index of the second layer is 1.37-1.57, preferably 1.37-1.5, more preferably 1.37-1.48. The optical thickness of the second layer is preferably 25-135 nm, more preferably 30-130 nm. The refractive index of the third layer is 1.75-2.5, preferably 1.86-2.33, more preferably 1.99-2.3. The optical thickness of the third layer is preferably 8-80 nm, more preferably 10-70 nm.

Though materials forming the first and third layers may be the same or different from each other, both of them are preferably made of $TaO_2+Y_2O_3+Pr_6O_{11}$. The first and third layers made of $TaO_2+Y_2O_3+Pr_6O_{11}$ has improved adhesion. To have improved anti-reflection performance, the second layer is preferably made of $MgF_2$.

(2) SUBSTRATE

The second and third anti-reflection coatings can be formed on the same substrate as in the first anti-reflection coating.

[5] SECOND AND THIRD OPTICAL MEMBERS

Figure 7:
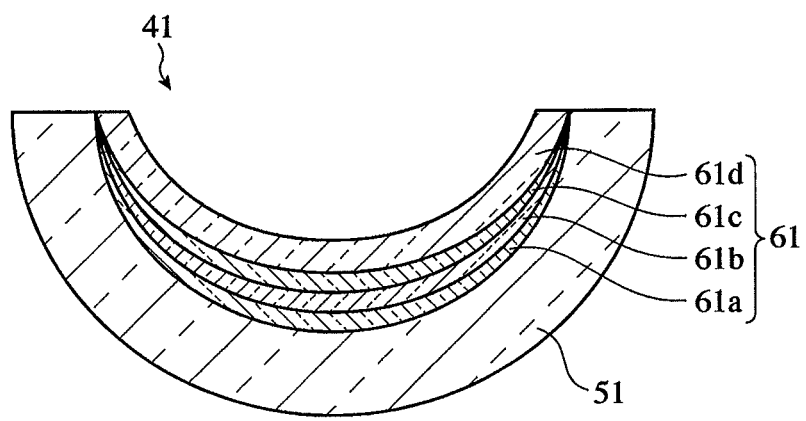
FIG. 7 is a schematic cross-sectional view showing a still further example of the optical members of the present invention.

FIG. 7 shows an optical member 41 comprising a lens substrate 51 having a refractive index of 1.6-1.9, whose effective diameter D and radius R of curvature meet the condition of $0.1 \leq D/R \leq 2$, and an anti-reflection coating 61 comprising first to fourth layers 61a, 61b, 61c, 61d formed in this order on the lens substrate 51. The lens substrate 51 may be the same as used in the first optical member, having the maximum inclination angle of 30-65°, particularly 30-60°. The anti-reflection coating 61 includes two types of the above-described second and third anti-reflection coatings. Because the anti-reflection coating 61 is the same as the second and third anti-reflection coatings 6, and because the lens substrate 51 is the same as the lens substrate 21 in the first optical member, explanation will be made only on other portions.

In any of the second and third optical members, each of the first to third layers 61a, 61b, 61c preferably has thickness gradually decreasing as it goes from a center portion to a peripheral portion in the lens substrate 51, as shown in FIG. 7. With the first to third layers 61a, 61b, 61c getting thinner toward the periphery, the anti-reflection coating exhibits good anti-reflection regardless of the inclination angle of a substrate, which is less influenced by the incident angle of light beams. It is particularly effective, when a lens substrate, whose maximum inclination angle is 30° or more, is used.

The optical thickness $D1(\theta_t)$ of the first layer 61a, the optical thickness $D2(\theta_t)$ of the second layer 61b and the optical thickness $D3(\theta_t)$ of the third layer 61c at an arbitrary inclination angle $\theta_t$ of the lens substrate 51 are preferably expressed by the following formulae (1) to (3):

$$D1(\theta_t) = D1_0 \times (\cos \theta_t)^\alpha \quad (1),$$

$$D2(\theta_t)=D2_0\times(\cos\theta_t)^\beta \quad (2), \text{ and}$$

$$D3(\theta_t)=D3_0\times(\cos\theta_t)^\gamma \quad (3),$$

wherein $D1_0$, $D2_0$ and $D3_0$ represent the optical thickness of the first to third layers 61a, 61b, 61c at a center of the lens substrate 51, and α, β and γ are numbers independently in a range of 0-1. α, β and γ are more preferably independently in a range of 0.5-0.95, most preferably independently in a range of 0.6-0.9.

The second and third optical members each having an anti-reflection coating having a four-layer structure comprising an uppermost silica aerogel layer exhibits excellent anti-reflection characteristics in wide ranges of wavelength and incident angle without using an $Al_2O_3$ layer, with the refractive indices of the first to third layers adjusted, and is free from fogging which would occur in conventional anti-reflection coatings comprising a silica aerogel layer and an $Al_2O_3$ layer, when stored under high-temperature, high-humidity conditions for a long period of time.

[6] PRODUCTION METHOD OF SECOND AND THIRD OPTICAL MEMBERS

The first to third layers in the second and third anti-reflection coatings can be produced by the same method as the first and second layers in the first anti-reflection coating. The fourth layer in the second and third anti-reflection coatings can be produced by the same method as the third layer in the first anti-reflection coating.

Because the above-described first to third optical members have the maximum reflectance of 6% or less in a visible light wavelength range of 400-700 nm, they are suitable for lenses mounted in optical equipments such as TV cameras, video cameras, digital cameras, vehicle cameras, microscopes, telescopes, etc., prisms, diffraction devices, etc. Particularly optical members having anti-reflection coatings on lens substrates having the maximum inclination angle of 300 or more are suitable for ultra-wide-angle lenses, pickup lenses of optical disks, etc., because they have good anti-reflection characteristics even in peripheral portions.

To provide waterproofness and durability to the first to third anti-reflection coatings, silica aerogel having organically modified silica end groups may be used for the uppermost layer. Also, a water-repellent, oil-repellent fluororesin coating may be formed on the uppermost layer of silica aerogel.

The present invention will be explained in further detail by Examples below without intention of restricting the present invention thereto.

EXAMPLE 1

A first layer of $MgF_2$, a second layer of $Ta_2O_5+Y_2O_3+Pr_6O_{11}$, and a third layer of silica aerogel were formed to the optical thickness shown in Table 1 on a flat glass plate of LaSF010 (refractive index: 1.839), to produce each Sample a to g. Because each of the first and second layers formed on a lens substrate having a large maximum inclination angle becomes gradually thinner as it goes from the center toward the periphery (as the inclination angle becomes larger) as shown in FIG. 2, the thickness of the first and second layers in each Sample a to g was set equal to the thickness at a lens substrate inclination angle of 0°, 10°, 20°, 30°, 40°, 50° and 60°, respectively, and the thickness of the third layer was set constant, to evaluate anti-reflection performance at each inclination angle of the lens substrate.

TABLE 1

| Layer | Material | Refractive Index |
|---|---|---|
| Substrate | LaSF010 | 1.839 |
| First Layer | $MgF_2$ | 1.388 |
| Second Layer | $Ta_2O_5 + Y_2O_3 + Pr_6O_{11}$ | 2.055 |
| Third Layer | Silica Aerogel | 1.270 |

| | Optical Thickness [nm] | | | | | | |
|---|---|---|---|---|---|---|---|
| Layer | Sample a | Sample b | Sample c | Sample d | Sample e | Sample f | Sample g |
| Substrate | — | — | — | — | — | — | — |
| First Layer | 41 | 40 | 39 | 37 | 34 | 30 | 25 |
| Second Layer | 34 | 34 | 33 | 31 | 29 | 25 | 21 |
| Third Layer | 150 | 150 | 150 | 150 | 150 | 150 | 150 |
| Angle[(1)] | 0 | 10 | 20 | 30 | 40 | 50 | 60 |

Note:
[(1)]A corresponding inclination angle (°) of the lens substrate.

The optical thickness $D1(\theta_t)$ of the first layer and the optical thickness $D2(\theta_t)$ of the second layer at each inclination angle $\theta_t$ of the lens substrate, which are shown in Table 1, were determined by the following formulae (1) and (2):

$$D1(\theta_t)=D1_0\times(\cos\theta_t)^\alpha \quad (1), \text{ and}$$

$$D2(\theta_t)=D2_0\times(\cos\theta_t)^\beta \quad (2),$$

wherein $D1_0$ and $D2_0$ represent the optical thickness of the first and second layers at a substrate inclination angle of 0°, and both α and β are 0.7.

The production method of each Sample a to g was as follows.

(1) FORMATION OF FIRST AND SECOND LAYERS

Using the apparatus shown in FIG. 21, a first layer of $MgF_2$ and a second layer of $Ta_2O_5+Y_2O_3+Pr_6O_{11}$ were formed to the optical thickness shown in Table 1 on a flat glass plate of LaSF010, by a vacuum vapor deposition method with electron beams.

(2) FORMATION OF THIRD LAYER (i) Preparation of First Acidic Sol 17.05 g of tetraethoxysilane was mixed with 69.13 g of methanol, and 3.88 g of an aqueous ammonia solution (3 N) was add to the resultant mixture and stirred at room temperature for 15 hours to prepare an alkaline sol. 40.01 g of this alkaline sol was mixed with 2.50 g of methanol and 1.71 g of hydrochloric acid (12 N), and stirred at room temperature for 30 minutes to prepare a first acidic sol (solid component: 4.94% by mass).

(ii) Preparation of Second Acidic Sol 30 ml of tetraethoxysilane was mixed with 30 ml of ethanol at room temperature, and then with 2.4 ml of water. Thereafter, 0.1 ml of hydrochloric *acid* (1 N) was added to the resultant mixture, and stirred at 60° C. for 90 minutes to prepare a second acidic sol (solid component: 14.8% by mass).

(iii) Preparation of Mixed Sol 0.22 g of the second acidic sol was added to a total amount of the first acidic sol, such that a solid component mass ratio of the first acidic sol to the second acidic sol was 67.1, and stirred at room temperature for 5 minutes to prepare a mixed sol.

(iv) Coating and Alkali Treatment

The mixed sol was applied to the second layer by a spin-coating method, dried at 80° C. for 0.5 hours, and then baked at 180° C. for 0.5 hours. The cooled coating was spin-coated with a 0.1-N aqueous sodium hydroxide solution, and dried at 120° C. for 0.5 hours.

Figure 8:
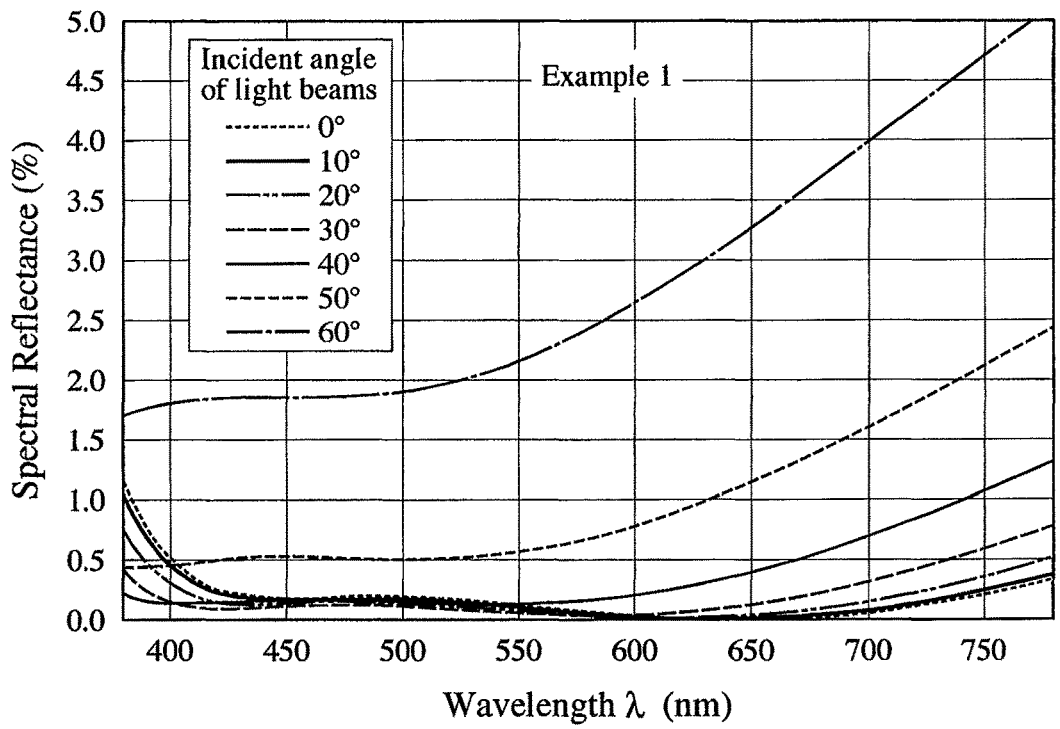
FIG. 8 is a graph showing the relation between spectral reflectance and the incident angle of light beams in the optical member of Example 1.
Figure 9:
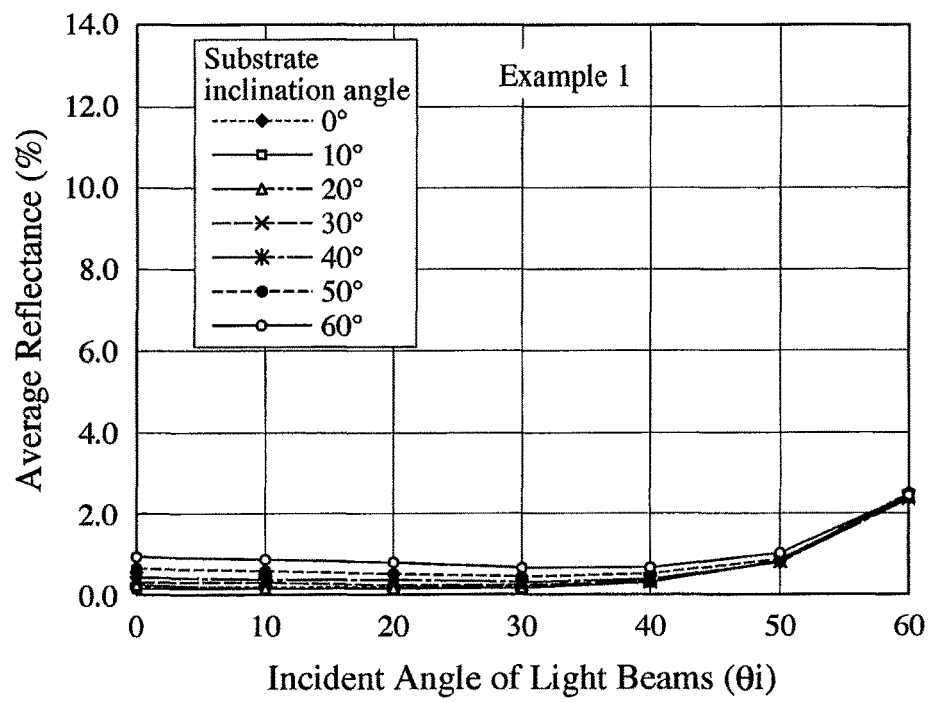
FIG. 9 is a graph showing the relation between average reflectance at each incident angle of light beams and a substrate inclination angle in the optical member of Example 1.

Using a lens reflectance meter (USPM-RU available from Olympus Corporation), the spectral reflectance of Sample a (corresponding to a substrate inclination angle of 00) thus obtained was measured at each light beam incident angle of 0°, 10°, 20°, 30°, 40°, 50° and 60°. The results are shown in FIG. 8. Average reflectance in a wavelength range of 400-700 nm was calculated from the measured spectral reflectance at each incident angle of light beams. With respect to Samples b to g (corresponding to substrate inclination angles of 100, 20°, 30°, 40°, 50° and 60°, respectively), spectral reflectance was similarly measured at each incident angle of light beams, and average reflectance in a wavelength range of 400-700 nm was calculated at each incident angle of light beams. The relation between the average reflectance at each substrate inclination angle and the incident angle of light beams is shown in FIG. 9.

COMPARATIVE EXAMPLE 1

Anti-reflection coatings (Samples a to g) were produced in the same manner as in Example 1, except for using $Al_2O_3$ and $SiO_2$ as materials for forming the first and second layers, and changing the optical thickness of the first to third layers as shown in Table 2. The anti-reflection coatings of these samples correspond to conventional ones designed to have a refractive index gradually decreasing from the first layer toward the third layer.

TABLE 2

| Layer | Material | Refractive Index |
|---|---|---|
| Substrate | LaSF010 | 1.839 |
| First Layer | $Al_2O_3$ | 1.640 |
| Second Layer | $SiO_2$ | 1.469 |
| Third Layer | Silica Aerogel | 1.250 |

| | Optical Thickness [nm] | | | | | | |
|---|---|---|---|---|---|---|---|
| Layer | Sample a | Sample b | Sample c | Sample d | Sample e | Sample f | Sample g |
| Substrate | — | — | — | — | — | — | — |
| First Layer | 114 | 113 | 109 | 103 | 95 | 84 | 70 |
| Second Layer | 25 | 25 | 24 | 23 | 21 | 18 | 15 |
| Third Layer | 126 | 126 | 126 | 126 | 126 | 126 | 126 |
| Angle[(1)] | 0 | 10 | 20 | 30 | 40 | 50 | 60 |

Note:
[(1)]A corresponding inclination angle (°) of the lens substrate.

Figure 10:
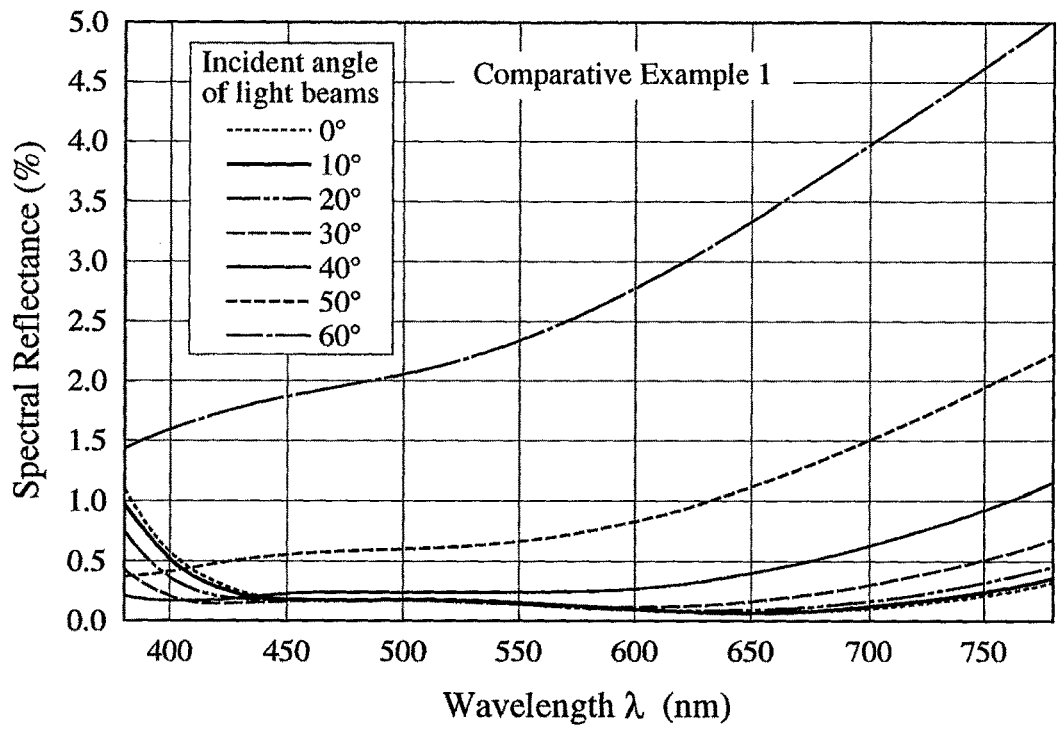
FIG. 10 is a graph showing the relation between spectral reflectance and the incident angle of light beams in the optical member of Comparative Example 1.
Figure 11:
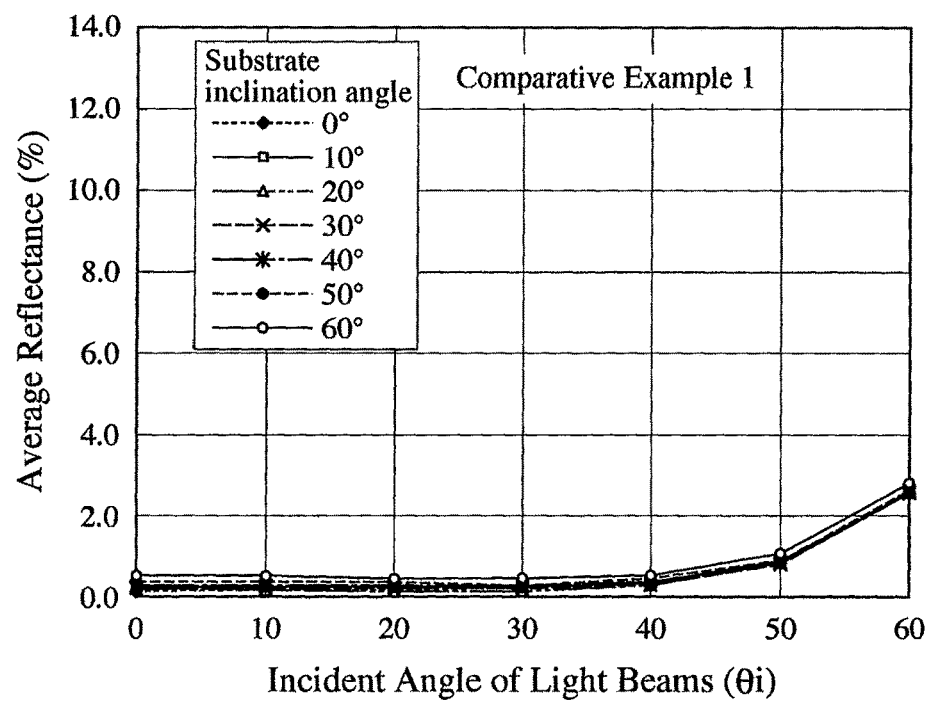
FIG. 11 is a graph showing the relation between average reflectance at each incident angle of light beams and a substrate inclination angle in the optical member of Comparative Example 1.

The spectral reflectance of Sample a (corresponding to a substrate inclination angle of 0°) thus obtained was measured at each light beam incident angle of 0°, 10°, 20°, 30°, 40°, 50° and 60° in the same manner as in Example 1. The results are shown in FIG. 10. As in Example 1, the relation between the average reflectance at each substrate inclination angle and the incident angle of light beams is shown in FIG. 11.

COMPARATIVE EXAMPLE 2

As shown in Table 3, an optical member comprising a seven-layer anti-reflection coating was produced.

(1) FORMATION OF FIRST TO SIXTH LAYERS

Using the apparatus shown in FIG. 21, first to sixth layers were formed in this order on a flat glass plate of LaSF010 (refractive index: 1.839) by a vacuum vapor deposition method with electron beams, as shown in Table 3. The vapor deposition was conducted at an initial degree of vacuum of $1.2 \times 10^{-5}$ Torr and a substrate temperature of 230° C.

(2) FORMATION OF SEVENTH LAYER

The seventh layer of silica aerogel layer was formed in the same manner as in the third layer of Example 1, except for changing the optical thickness as shown in Table 3.

TABLE 3

| Layer | Material | Refractive Index |
|---|---|---|
| Substrate | LaSF010 | 1.839 |
| First Layer | $Al_2O_3$ | 1.640 |
| Second Layer | $Ta_2O_5 + Pr_6O_{11} + Y_2O_3$ | 2.055 |
| Third Layer | $MgF_2$ | 1.388 |
| Fourth Layer | $Ta_2O_5 + Pr_6O_{11} + Y_2O_3$ | 2.055 |
| Fifth Layer | $MgF_2$ | 1.388 |
| Sixth Layer | $Ta_2O_5 + Pr_6O_{11} + Y_2O_3$ | 2.055 |
| Seventh Layer | Silica Aerogel | 1.250 |

| | Optical Thickness [nm] | | | | | | |
|---|---|---|---|---|---|---|---|
| Layer | Sample a | Sample b | Sample c | Sample d | Sample e | Sample f | Sample g |
| Substrate | — | — | — | — | — | — | — |
| First Layer | 45 | 45 | 43 | 41 | 38 | 33 | 28 |
| Second Layer | 61 | 60 | 58 | 61 | 51 | 45 | 38 |
| Third Layer | 25 | 25 | 24 | 23 | 21 | 18 | 15 |
| Fourth Layer | 262 | 259 | 251 | 237 | 218 | 192 | 161 |
| Fifth Layer | 34 | 34 | 33 | 31 | 28 | 25 | 21 |
| Sixth Layer | 37 | 37 | 36 | 34 | 31 | 28 | 23 |
| Seventh Layer | 135 | 135 | 135 | 135 | 135 | 135 | 135 |
| Angle[(1)] | 0 | 10 | 20 | 30 | 40 | 50 | 60 |

Note:
[(1)]A corresponding inclination angle (°) of the lens substrate.

Figure 12:
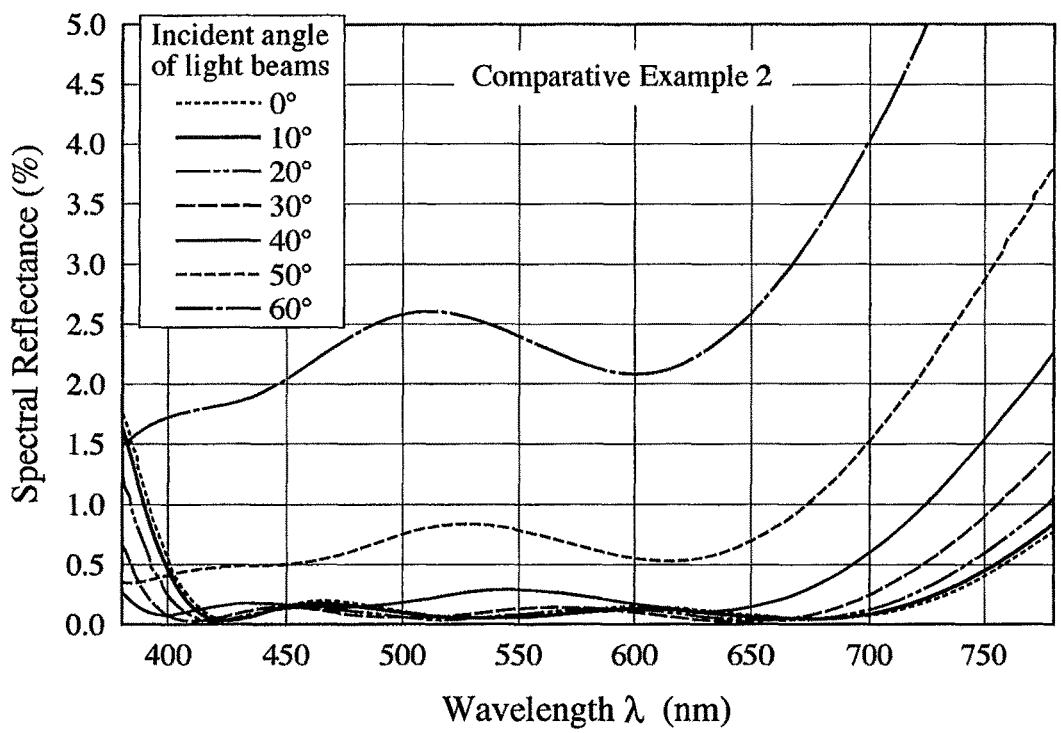
FIG. 12 is a graph showing the relation between spectral reflectance and the incident angle of light beams in the optical member of Comparative Example 2.

The spectral reflectance of Sample a (corresponding to a substrate inclination angle of 0°) thus obtained was measured at each light beam incident angle of 0°, 10°, 20°, 30°, 40°, 50° and 60° in the same manner as in Example 1. The results are shown in FIG. 12. As in Example 1, the relation between the average reflectance at each substrate inclination angle and the incident angle of light beams is shown in FIG. 13.

Figure 13:
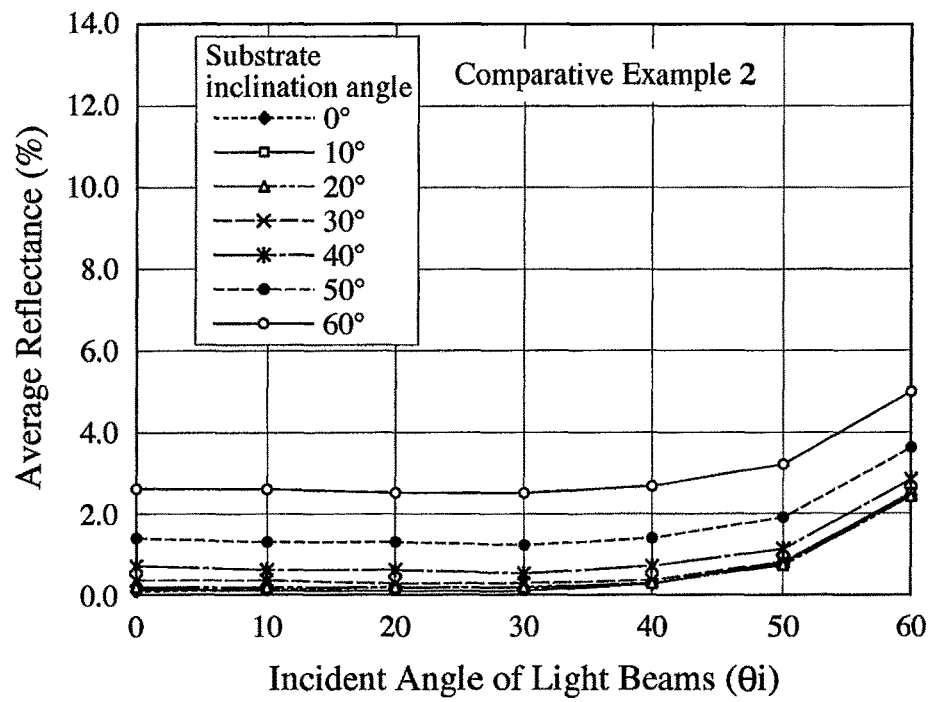
FIG. 13 is a graph showing the relation between average reflectance at each incident angle of light beams and a substrate inclination angle in the optical member of Comparative Example 2.

As is clear from FIGS. 12 and 13, the samples of Comparative Example 2 exhibited much poorer anti-reflection performance than those of Example 1 in portions with large inclination angles (40-60°), despite as many as 7 layers.

COMPARATIVE EXAMPLE 3

Optical members were produced in the same manner as in Comparative Example 2, except for changing the uppermost layer (seventh layer) of the anti-reflection coating from the silica aerogel layer to a $MgF_2$ layer formed by a vacuum vapor deposition method. Like other layers, the thickness of the seventh layer decreased gradually in the order of Samples a to g.

Using the apparatus shown in FIG. 21, first to seventh layers were formed in this order on a flat glass plate of LaSF010 (refractive index: 1.839) by a vacuum vapor deposition method with electron beams, as shown in Table 4. The vapor deposition was conducted at an initial degree of vacuum of $1.2 \times 10^{-5}$ Torr and a substrate temperature of 230° C.

TABLE 4

| Layer | Material | Refractive Index |
|---|---|---|
| Substrate | LaSF010 | 1.839 |
| First Layer | $Al_2O_3$ | 1.640 |
| Second Layer | $Ta_2O_5 + Pr_6O_{11} + Y_2O_3$ | 2.055 |
| Third Layer | $MgF_2$ | 1.388 |
| Fourth Layer | $Ta_2O_5 + Pr_6O_{11} + Y_2O_3$ | 2.055 |
| Fifth Layer | $MgF_2$ | 1.388 |
| Sixth Layer | $Ta_2O_5 + Pr_6O_{11} + Y_2O_3$ | 2.055 |
| Seventh Layer | $MgF_2$ | 1.388 |

| | Optical Thickness [nm] | | | | | | |
|---|---|---|---|---|---|---|---|
| Layer | Sample a | Sample b | Sample c | Sample d | Sample e | Sample f | Sample g |
| Substrate | — | — | — | — | — | — | — |
| First Layer | 33 | 33 | 32 | 30 | 28 | 24 | 20 |
| Second Layer | 64 | 64 | 62 | 64 | 54 | 47 | 40 |
| Third Layer | 25 | 25 | 24 | 23 | 21 | 18 | 15 |
| Fourth Layer | 283 | 280 | 271 | 256 | 235 | 208 | 174 |
| Fifth Layer | 25 | 25 | 24 | 23 | 21 | 18 | 15 |
| Sixth Layer | 25 | 25 | 24 | 23 | 21 | 18 | 15 |
| Seventh Layer | 116 | 114 | 111 | 105 | 96 | 85 | 71 |
| Angle[(1)] | 0 | 10 | 20 | 30 | 40 | 50 | 60 |

Note:
[(1)]A corresponding inclination angle (°) of the lens substrate.

Figure 14:
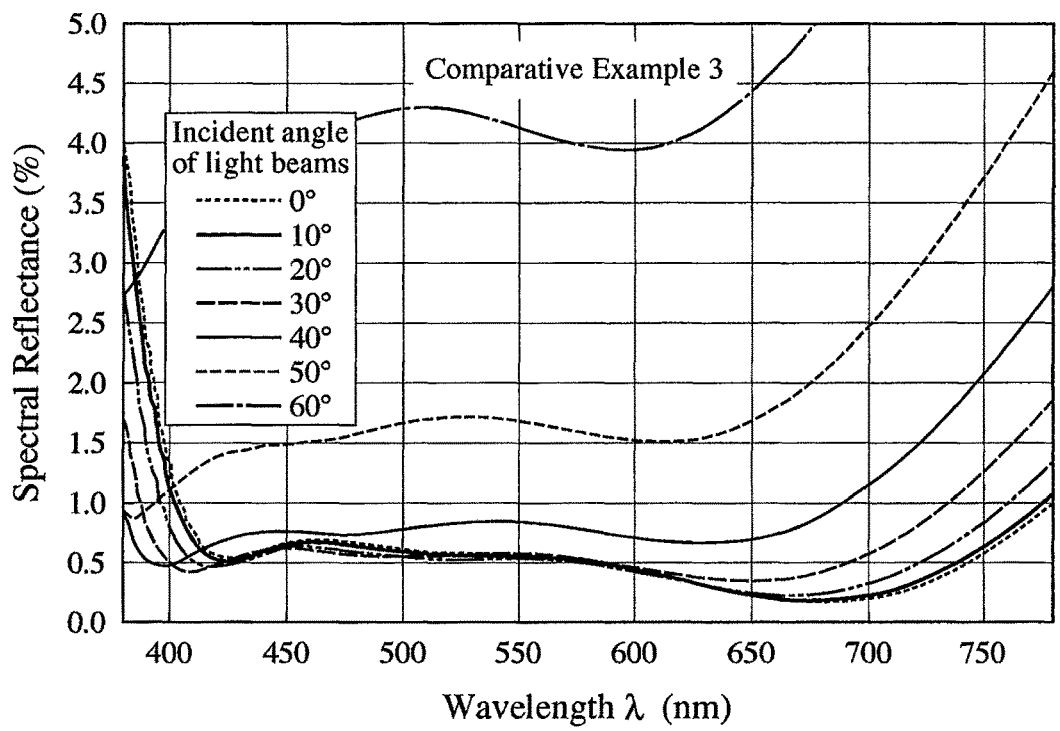
FIG. 14 is a graph showing the relation between spectral reflectance and the incident angle of light beams in the optical member of Comparative Example 3.

The spectral reflectance of Sample a (corresponding to a substrate inclination angle of 0°) thus obtained was measured at each light beam incident angle of 0°, 10°, 20°, 30°, 40°, 50° and 60° in the same manner as in Example 1. The results are shown in FIG. 14. As in Example 1, the relation between the average reflectance at each substrate inclination angle and the incident angle of light beams is shown in FIG. 15.

Figure 15:
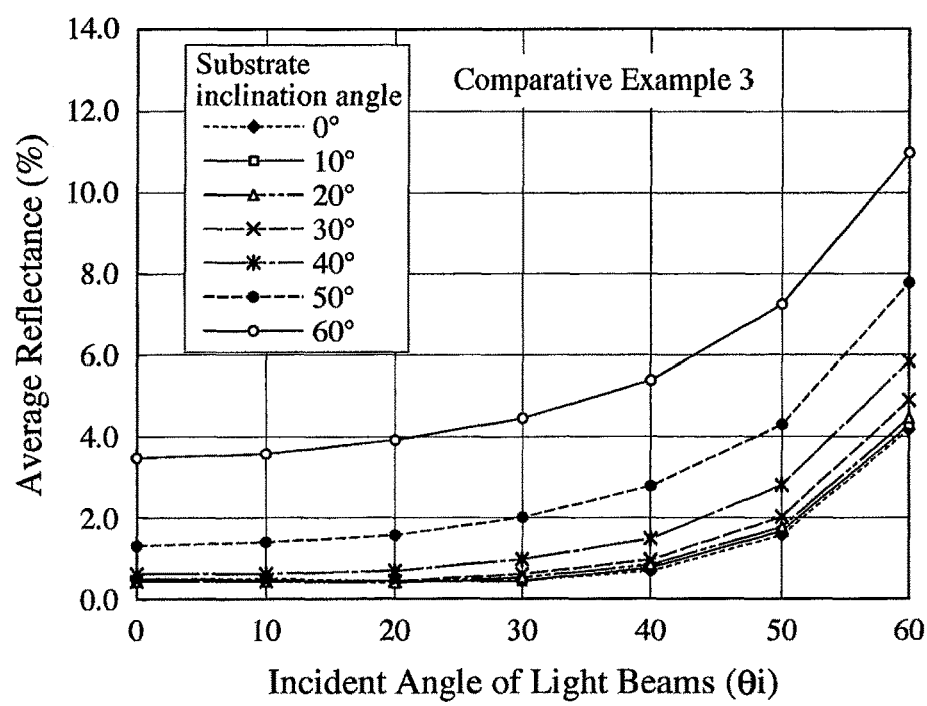
FIG. 15 is a graph showing the relation between average reflectance at each incident angle of light beams and a substrate inclination angle in the optical member Comparative Example 3.

As is clear from FIGS. 14 and 15, the samples of Comparative Example 3, which had the outermost layers becoming thinner as the substrate inclination angle increased, exhibited extremely poor anti-reflection performance in portions with large substrate inclination angles (30-60°).

EXAMPLE 2

A first layer of $SiO_2$ (refractive index: 1.469), a second layer of $Ta_2O_5+Y_2O_3+Pr_6O_{11}$ (refractive index: 2.055), a third layer of $SiO_2$ (refractive index: 1.469) and a fourth layer of silica aerogel (refractive index: 1.250) were formed to each optical thickness shown in Table 5 on a flat glass plate of LaSF010 (refractive index: 1.839) by the same method as in Example 1, to produce Samples a to g To evaluate the anti-reflection performance of an anti-reflection coating on a lens substrate having a large maximum inclination angle as shown in FIG. 7 at each substrate inclination angle, each of Samples a to g comprised first to fourth layers formed on a flat glass plate at thickness corresponding to the thickness of each layer at a lens substrate inclination angle of 0°, 10°, 20°, 30°, 40°, 50° and 60°, the first to third layers becoming gradually thinner from Sample a to Sample g, and the fourth layer having a constant thickness.

TABLE 5

| Layer | Material | Refractive Index |
|---|---|---|
| Substrate | LaSF010 | 1.839 |
| First Layer | $SiO_2$ | 1.640 |
| Second Layer | $Ta_2O_5 + Y_2O_3 + Pr_6O_{11}$ | 2.055 |
| Third Layer | $SiO_2$ | 1.469 |
| Fourth Layer | Silica Aerogel | 1.250 |

| | Optical Thickness [nm] | | | | | | |
|---|---|---|---|---|---|---|---|
| Layer | Sample a | Sample b | Sample c | Sample d | Sample e | Sample f | Sample g |
| Substrate | — | — | — | — | — | — | — |
| First Layer | 38 | 37 | 36 | 34 | 31 | 28 | 23 |
| Second Layer | 24 | 24 | 23 | 22 | 20 | 18 | 15 |
| Third Layer | 68 | 67 | 65 | 61 | 56 | 50 | 42 |
| Fourth Layer | 116 | 116 | 116 | 116 | 116 | 116 | 116 |
| Angle[(1)] | 0 | 10 | 20 | 30 | 40 | 50 | 60 |

Note:
[(1)]A corresponding inclination angle (°) of the lens substrate.

The optical thickness $D1(\theta_t)$ of the first layer, the optical thickness $D2(\theta_t)$ of the second layer and the optical thickness $D3(\theta_t)$ of the third layer at each substrate inclination angle ($\theta_t$), which are shown in Table 5, were determined by the following formulae (1) to (3):

$$D1(\theta_t) = D1_0 \times (\cos \theta_t)^\alpha \quad (1),$$

$$D2(\theta_t) = D2_0 \times (\cos \theta_t)^\beta \quad (2), \text{ and}$$

$$D3(\theta_t) = D3_0 \times (\cos \theta_t)^\gamma \quad (3),$$

wherein $D1_0$, $D2_0$ and $D3_0$ represent the optical thickness of the first to third layers at a substrate inclination angle of 0°, and all of $\alpha$, $\beta$ and $\gamma$ are 0.7.

Figure 16:
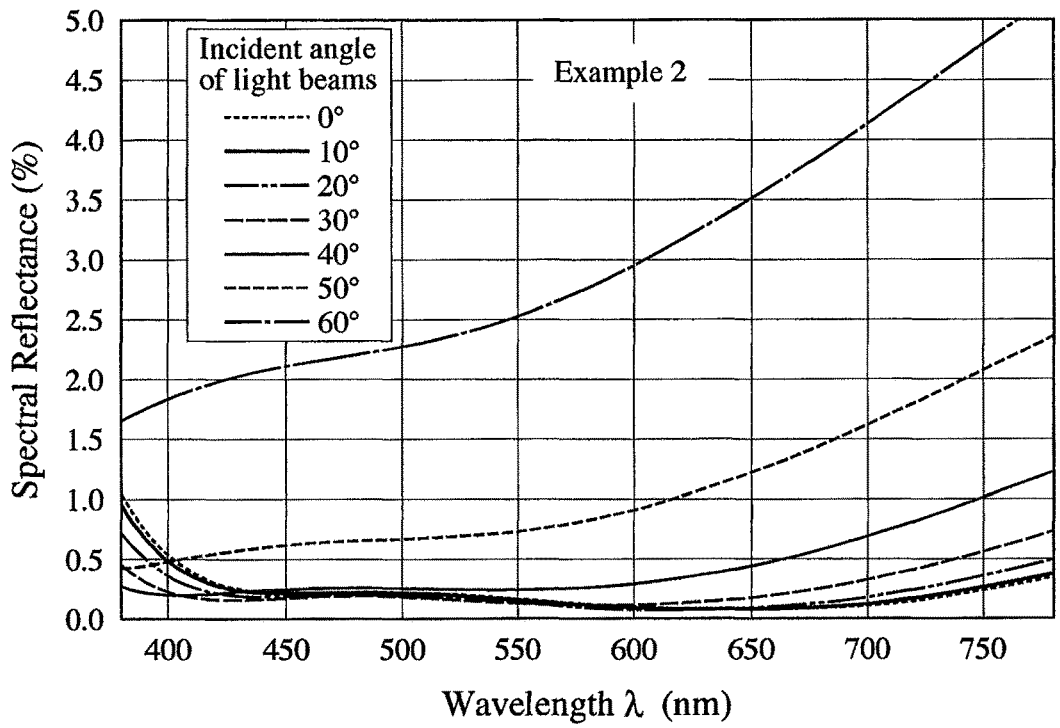
FIG. 16 is a graph showing the relation between spectral reflectance and the incident angle of light beams in the optical member of Example 2.
Figure 17:
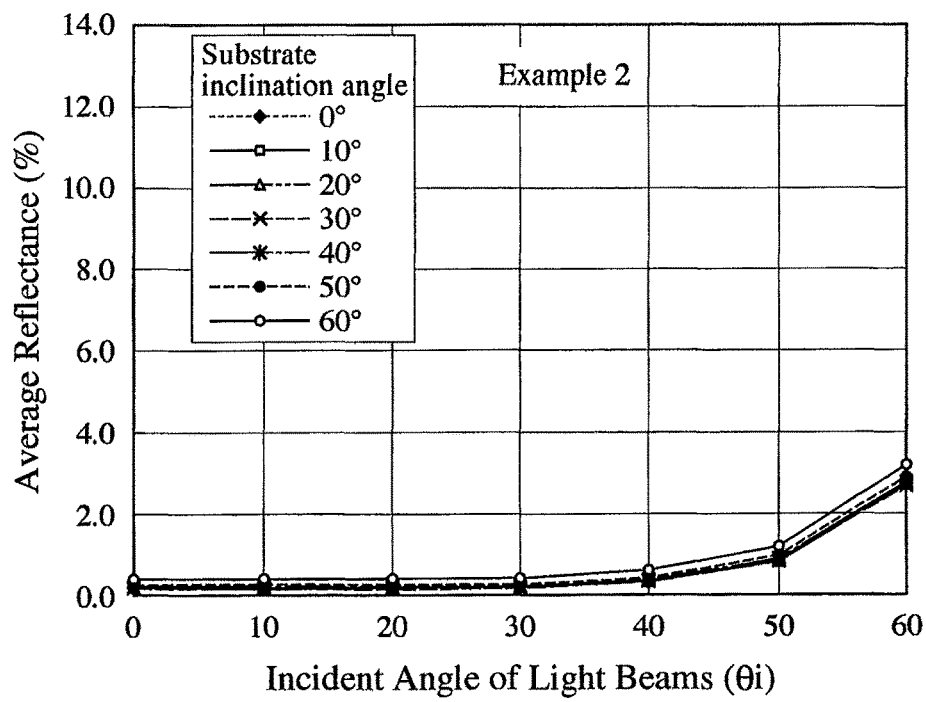
FIG. 17 is a graph showing the relation between average reflectance at each incident angle of light beams and a substrate inclination angle in the optical member of Example 2.

The spectral reflectance of Sample a (corresponding to a substrate inclination angle of 0°) thus obtained was measured at each light beam incident angle of 0°, 10°, 20°, 30°, 40°, 50° and 60° in the same manner as in Example 1. The results are shown in FIG. 16. Average reflectance in a wavelength range of 400-700 nm was calculated from the measured spectral reflectance at each incident angle of light beams. With respect to Samples b to g (corresponding to substrate inclination angles of 10°, 20°, 30°, 40°, 50° and 60°, respectively), spectral reflectance at each incident angle of light beams was similarly measured, and average reflectance in a wavelength range of 400-700 nm was calculated at each incident angle of light beams. The relation between the average reflectance at each substrate inclination angle and the incident angle of light beams is shown in FIG. 17.

ACCELERATED ENVIRONMENTAL TESTING

Each of Samples a, d and f (having substrate inclination angles of 0°, 30° and 50°, respectively) of Example 1, Comparative Example 1 and Example 2 was stored at 60° C.

and 90% RH for 48 hours for accelerated environmental testing Their spectral reflection characteristics measured by the same method as described above after the accelerated environmental testing were compared with those before the testing. The results are shown in FIG. 18 (Example 1), FIG. 19 (Comparative Example 1) and FIG. 20 (Example 2).

Figure 18:
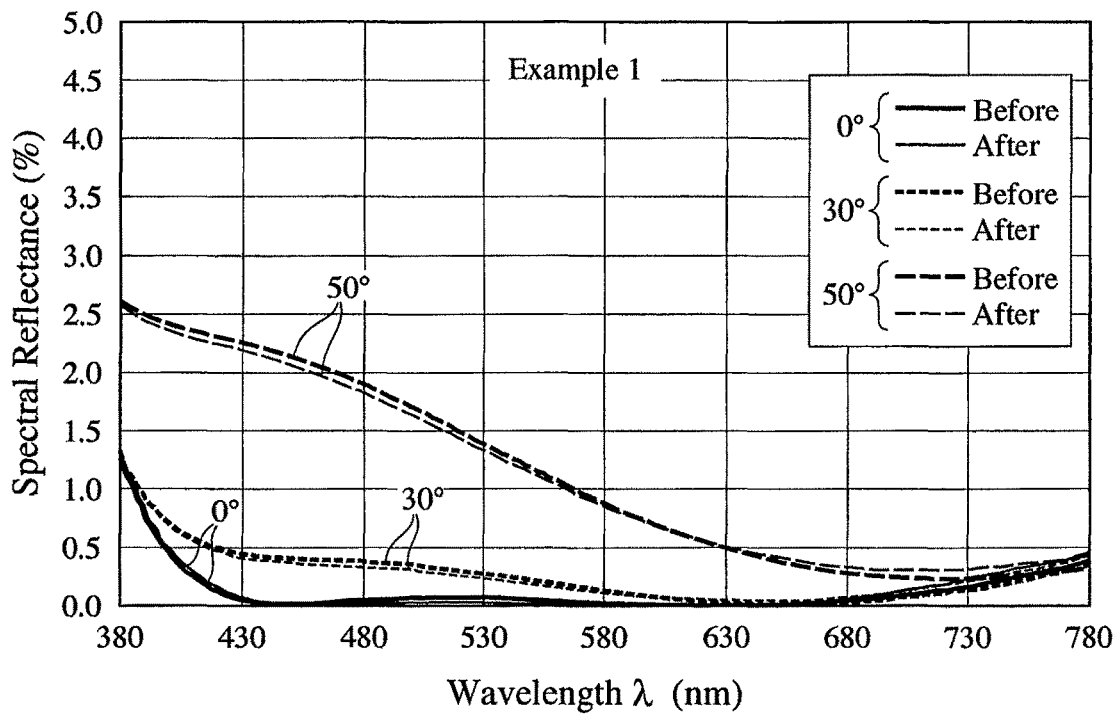
FIG. 18 is a graph showing the relation between spectral reflectance before and after the accelerated environmental testing and a substrate inclination angle in the optical member of Example 1.
Figure 19:
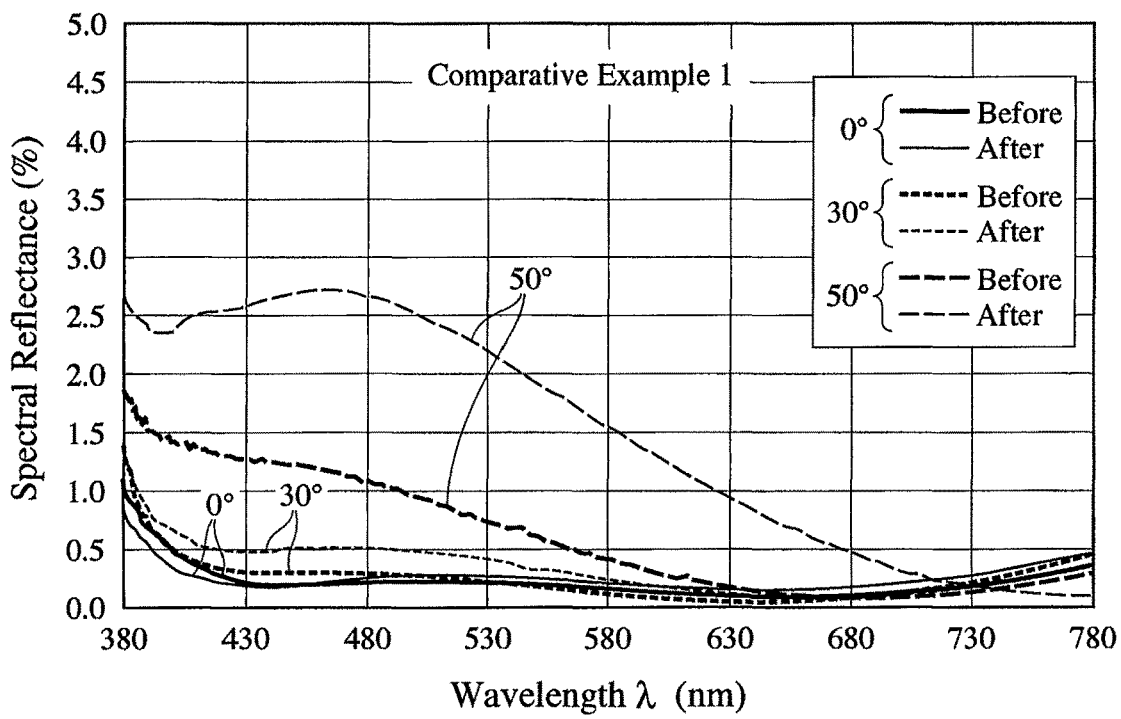
FIG. 19 is a graph showing the relation between spectral reflectance before and after the accelerated environmental testing and a substrate inclination angle in the optical member of Comparative Example 1.
Figure 20:
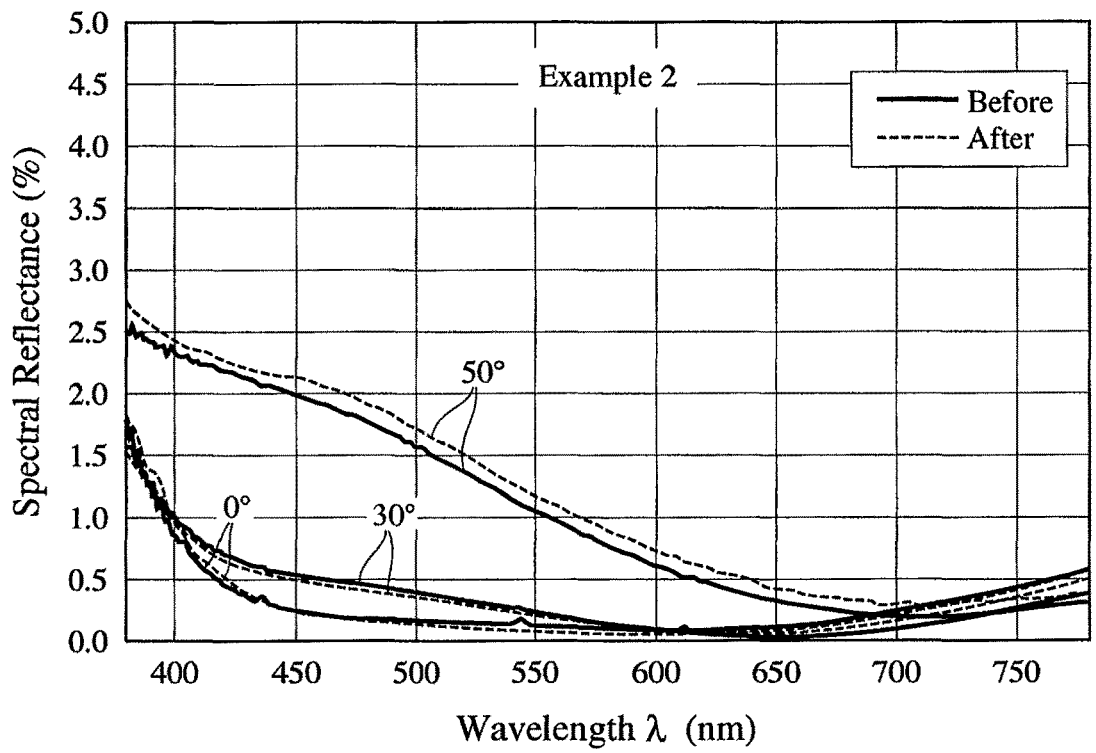
FIG. 20 is a graph showing the relation between spectral reflectance before and after the accelerated environmental testing and a substrate inclination angle in the optical member of Example 2.

As is clear from FIGS. 18-20, the samples of Comparative Example 1 exhibited poor spectral reflection characteristics after the accelerated environmental testing under the high-temperature, high-humidity conditions, while the spectral reflection characteristics of the samples of Examples 1 and 2 were not substantially deteriorated, indicating that their anti-reflection characteristics at high temperatures and humidity were highly durable.

EFFECT OF THE INVENTION

Because the anti-reflection coating of the present invention has excellent storage stability, particularly exhibiting stable anti-reflection performance even when stored under high-temperature, high-humidity conditions for a long period of time, it is suitable for imaging equipments such as exchange lenses for single-lens reflex cameras, etc. Further, the anti-reflection coating of the present invention can be produced at a high yield, because of excellent production stability.

Because the optical member of the present invention exhibits excellent anti-reflection performance in a wide wavelength range even on a lens substrate having a maximum inclination angle of 30° or more, it is particularly suitable for ultrawide-angle lenses, lenses having small radii of curvature to effective diameters, pickup lenses of optical disks, etc.

What is claimed is:

1. An anti-reflection coating having:
a three-layer structure comprising first to third layers formed in this order on a substrate;
said substrate having a refractive index of 1.6-1.9, said first layer having a refractive index of 1.37-1.5, said second layer having a refractive index of 1.75-2.5, and said third layer having a refractive index of 1.18-1.32, to light in a wavelength range of 550 nm;
said third layer being made of silica aerogel formed by a sol-gel method;
said second layer being made of $TaO_2+Y_2O_3+Pr_6O_{11}$ or $Ta_2O_5+Y_2O_3+Pr_6O_{11}$; and
said first and second layers containing no $Al_2O_3$.

2. The anti-reflection coating according to claim 1;
wherein said first and second layers are formed by a dry process.

3. An optical member comprising:
the anti-reflection coating recited in claim 1 on a lens substrate, whose effective diameter D and radius R of curvature meet the condition of 0.1 <D/R <2.

4. The optical member according to claim 3;
wherein said first and second layers are formed by a dry process.

5. The optical member according to claim 3;
wherein said lens substrate has the maximum inclination angle of 30-65°.

6. The optical member according to claim 3;
wherein an optical thickness $D1(\theta_t)$ of the first layer and an optical thickness of the second layer $D2(\theta_t)$ at an arbitrary inclination angle $\theta_t$ of said lens substrate are respectively expressed by the following formulae (1) and (2):

$$D1(\theta_t)=D1_0\times(\cos\theta_t)^\alpha \quad (1), \text{and}$$

$$D2(\theta_t)=D2_0\times(\cos\theta_t)^\beta \quad (2),$$

wherein:
$D1_0$ and $D2_0$ represent optical thicknesses of said first and second layers at a center of said lens substrate; and
$\alpha$ and $\beta$ are numbers independently in a range of 0-1.

7. The optical member according to claim 3;
wherein a thickness of said third layer is constant regardless of the inclination angle of said lens substrate, or larger in a peripheral portion of the lens substrate than at a center of the lens substrate.

* * * * *